US008785035B2

(12) United States Patent
Maezawa et al.

(10) Patent No.: US 8,785,035 B2
(45) Date of Patent: Jul. 22, 2014

(54) COMPOSITION FOR MANUFACTURING CONTACTS, AND CONTACTS AND CONNECTOR USING SAME

(75) Inventors: Kuniyoshi Maezawa, Kyoto (JP); Yoko Ishikawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 13/322,083

(22) PCT Filed: Mar. 4, 2011

(86) PCT No.: PCT/JP2011/055144
§ 371 (c)(1),
(2), (4) Date: Nov. 22, 2011

(87) PCT Pub. No.: WO2011/111639
PCT Pub. Date: Sep. 15, 2011

(65) Prior Publication Data

US 2012/0077069 A1 Mar. 29, 2012

(30) Foreign Application Priority Data

Mar. 11, 2010 (JP) ................................ 2010-055143

(51) Int. Cl.

| | |
|---|---|
| ***H01M 2/02*** | (2006.01) |
| ***H01M 2/24*** | (2006.01) |
| ***H01M 6/42*** | (2006.01) |
| ***C22C 19/05*** | (2006.01) |
| ***C25D 7/00*** | (2006.01) |

(52) U.S. Cl.
USPC ........... 429/170; 429/121; 429/158; 429/160; 429/161; 420/454; 205/50; 205/51

(58) Field of Classification Search
USPC ................ 429/121, 157, 158, 160, 161, 170; 420/454; 205/50, 51
See application file for complete search history.

(56) References Cited

U.S. PATENT DOCUMENTS

| | | | | |
|---|---|---|---|---|
| 3,963,587 | A | 6/1976 | Kreckel | |
| 2003/0144388 | A1* | 7/2003 | Swift et al. | 524/79 |
| 2006/0068272 | A1 | 3/2006 | Takami et al. | |
| 2006/0087794 | A1* | 4/2006 | Sakata et al. | 361/303 |

(Continued)

FOREIGN PATENT DOCUMENTS

| | | |
|---|---|---|
| CN | 1753240 A | 3/2006 |
| JP | 2000-244084 A | 9/2000 |

(Continued)

OTHER PUBLICATIONS

International Search Report issued in PCT/JP2011/055144, mailed on Apr. 5, 2011, with translation, 7 pages.

(Continued)

*Primary Examiner* — Muhammad Siddiquee
(74) *Attorney, Agent, or Firm* — Osha Liang LLP

(57) ABSTRACT

A composition for making a contact contains predetermined amounts of cobalt and sulfur and has a predetermined average particle size. The composition for making the contact includes a nickel-cobalt alloy containing 20% by weight to 55% by weight of cobalt, and 0.002 part by weight to 0.02 part by weight of sulfur with respect to 100 parts by weight of the nickel-cobalt alloy, the composition having an average particle size of 0.10 μm to 0.35 μm. The contact made with the composition may be included in a connector.

7 Claims, 6 Drawing Sheets

(56) References Cited

U.S. PATENT DOCUMENTS

| | | | | |
|---|---|---|---|---|
| 2008/0293297 | A1 | 11/2008 | Wakamatsu et al. | |
| 2010/0065430 | A1 * | 3/2010 | Hemmi et al. | 205/50 |
| 2010/0107927 | A1 * | 5/2010 | Stewart et al. | 106/1.22 |
| 2010/0201326 | A1 | 8/2010 | Takami et al. | |

FOREIGN PATENT DOCUMENTS

| | | | |
|---|---|---|---|
| JP | 2006-128326 | A | 5/2006 |
| JP | 2006-347165 | A | 12/2006 |
| JP | 2008-078061 | A | 4/2008 |
| JP | 2008-262780 | A | 10/2008 |
| WO | 2010/089840 | A1 | 8/2010 |

OTHER PUBLICATIONS

Chinese Office Action issued in Chinese Application No. 201180002181.6 mailed on Jul. 30, 2012, and English translation thereof, 12 pages.

Kubota et al., "The Effect of S Content in Deposit on Low-cycle Fatigue Properties of Ni Film Electroplated from Sulfamate Baths." The Iron and Steel Institute of Japan (ISIJ), vol. 86, No. 1, 2000, pp. 38-44, and partial English translation thereof (8 pages).

Partial translation of Japanese Publication No. 2000-244084 published on Sep. 8, 2000, 2 pages.

Office Action issued in corresponding Taiwanese Application No. 100107072 dated Jul. 23, 2013, and English translation thereof (17 pages).

* cited by examiner

PRIOR ART

COMPOSITION FOR MANUFACTURING CONTACTS, AND CONTACTS AND CONNECTOR USING SAME

TECHNICAL FIELD

The present invention relates to compositions for making contacts, contacts made therewith, and connectors. Specifically, the present invention relates to a composition for making a contact which composition contains a predetermined amount of cobalt and a predetermined amount of sulfur and has a predetermined average particle size, a contact made therewith, and a connector.

BACKGROUND ART

Connectors are widely used to attach and detach an electronic part, a cable, or the like to and from another part for mutual exchange of electrical power, a signal, or the like between the parts or between the part and the cable. A connector includes: a housing constituted by an insulator such as resin; and a contact constituted by metal. Such a contact needs to be pressed against a conductive member of a part to which it is connected, such as an electrode of a battery, so as to be in touch (sliding contact) with the conductive member. In order to maintain the touch, the contact is required to elastically deform in resistance to a load being applied to the contact along with the touch and, when the load has been removed, elastically deform to return to the state in which it had been before the application of the load.

FIG. 5 is a vertical cross-sectional view showing an example of a contact of a common battery connector. (a) of FIG. 5 shows a state in which no load is being applied, and (b) of FIG. 5 shows a state in which a load is being applied. In FIG. 5, a contact 200 includes: a retaining section 201, which is fixed by an insulator; a contact section 202, which makes sliding contact with a conductive member; and an elastic deformation section 203, which connects the retaining section and the contact section to each other and which is elastically deformable. The contact 200 is connected to a conductive member 204.

Sliding contact of the contact section 202 with the conductive member causes a load to be applied to the elastic deformation section 203, with the result that, as shown in (b) of FIG. 5, the elastic deformation section 203 elastically deforms. The larger the amount of displacement of the elastic deformation section 203 along with the application of the load is, i.e., the longer the stroke is, the larger the force of contact between the contact 200 and the conductive member 204 is. In this specification, the stroke for achieving necessary and sufficient contact force required of the contact is referred to as "long stroke".

For a long stroke, it is necessary for the contact to be constituted by a material having a high spring bending elastic limit. Further, repetition of attachment and detachment with a long stroke causes the stress of a load to go beyond the acceptable range of stress, with the result that the contact is damaged by fatigue. Therefore, it is necessary to limit the stress of a load to the acceptable range of stress.

In order for the stress of a load to fall within the acceptable range of stress, it is necessary for the material constituting the contact to have a high tensile strength. Further, because the contact is used in applications where it is necessary to pass an electric current through the contact, a high conductivity is required. A low conductivity results in generation of heat due to power loss, thus making it impossible to pass an electric current. Further, from a point of view of energy conservation, a reduction in power loss is required.

Furthermore, in order for the contact to keep necessary contact force even after repetition of attachment and detachment, it is important for the elastic deformation section 203 not to exhibit a creep when the load has been removed. The term "creep" here means a time-dependent deformation of a material caused by constant stress at constant temperature.

That is, the occurrence of a creep causes the elastic deformation section 203 to remain strained when the load being applied to the elastic deformation section 203, for example, in the state of (b) of FIG. 5, has been removed, with the result that the elastic deformation section 203 does not return to its former state (state of (a) of FIG. 5). This renders the contact unable to keep the same contact force as before when it is brought into sliding contact with the conductive member again.

Patent Literature 1 discloses a contact formed into a spiral shape by using an electroformed layer made of a nickel-cobalt (NiCo) alloy having a fine average particle size of 20 nm or smaller. In the Patent Literature 1, the NiCo alloy has a fine particle size for higher strength. However, because, as confirmed in the comparative examples to be described later by the inventors of the present invention, a finer average particle size leads to notable occurrence of a creep, the contact is thought to be in a spiral shape for the purpose of suppressing the occurrence of a creep.

Patent Literature 1

Japanese Patent Application Publication, Tokukai, No. 2008-78061 (Publication Date: Apr. 3, 2008)

SUMMARY OF INVENTION

When a semiconductor including a spiral-shaped contact disclosed in Patent Literature 1 is pressed with its back side facing an insulating substrate, the spiral terminal makes contact with an outer surface of a spherical elastic terminal in such a way as to be wound around the outer surface in a spiral manner, whereby an electrical connection is made between each separate spherical terminal and each separate spiral terminal (paragraph [0012] of Patent Literature 1). However, because the spiral shape is a very unique shape, limitations are placed on the range of conductive members to which the contact is to be connected; therefore, the contact cannot be applied to general-purpose connection terminals.

That is, there has been no material sufficient to achieve a contact which can exhibit a long stroke, which can sufficiently suppress the occurrence of a creep, and which has excellent versatility. One or more embodiments of the present invention provide a composition for making a contact which composition contains a predetermined amount of cobalt and a predetermined amount of sulfur and has a predetermined average particle size, a contact made therewith, and a connector.

The inventors of the present invention diligently studied materials capable of providing a contact that does not need to take a unique shape such as a spiral shape to exhibit a long stroke and sufficiently suppress the occurrence of a creep, and found, as a result, a composition for making a contact which composition contains a nickel-cobalt alloy containing a predetermined amount of cobalt and a predetermined amount of sulfur and has a predetermined average particle size, thus accomplishing the present invention.

That is, a composition for making a contact according to one or more embodiments of the present invention includes: a nickel-cobalt alloy containing 20% by weight to 55% by weight of cobalt; and 0.002 part by weight to 0.02 part by weight of sulfur with respect to 100 parts by weight of the nickel-cobalt alloy, the composition having an average particle size of 0.10 μm to 0.35 μm.

As will be evidenced by the results shown in the examples later, the composition for making a contact is configured to have the aforementioned cobalt content and sulfur content and to have its average particle size adjusted to 0.10 μm to 0.35 μm, and as such, can exhibit excellence in spring bending elastic limit, in tensile strength, and in conductivity.

Therefore, the composition can be suitably used as a material for achieving a contact which can exhibit a long stroke, which can sufficiently suppress the occurrence of a creep, and which has excellent versatility.

A composition for making a contact according to one or more embodiments of the present invention includes: a nickel-cobalt alloy containing 20% by weight to 55% by weight of cobalt; and 0.002 part by weight to 0.02 part by weight of sulfur with respect to 100 parts by weight of the nickel-cobalt alloy, the composition having an average particle size of 0.10 μm to 0.35 μm, preferably 0.14 μm to 0.35 μm, or more preferably 0.23 μm to 0.35 μm.

Therefore, the composition brings about an effect of being able to be suitably used as a material for achieving a contact which can exhibit a long stroke, which can sufficiently suppress the occurrence of a creep, and which has excellent versatility.

DETAILED DESCRIPTION OF INVENTION

Figure 1:
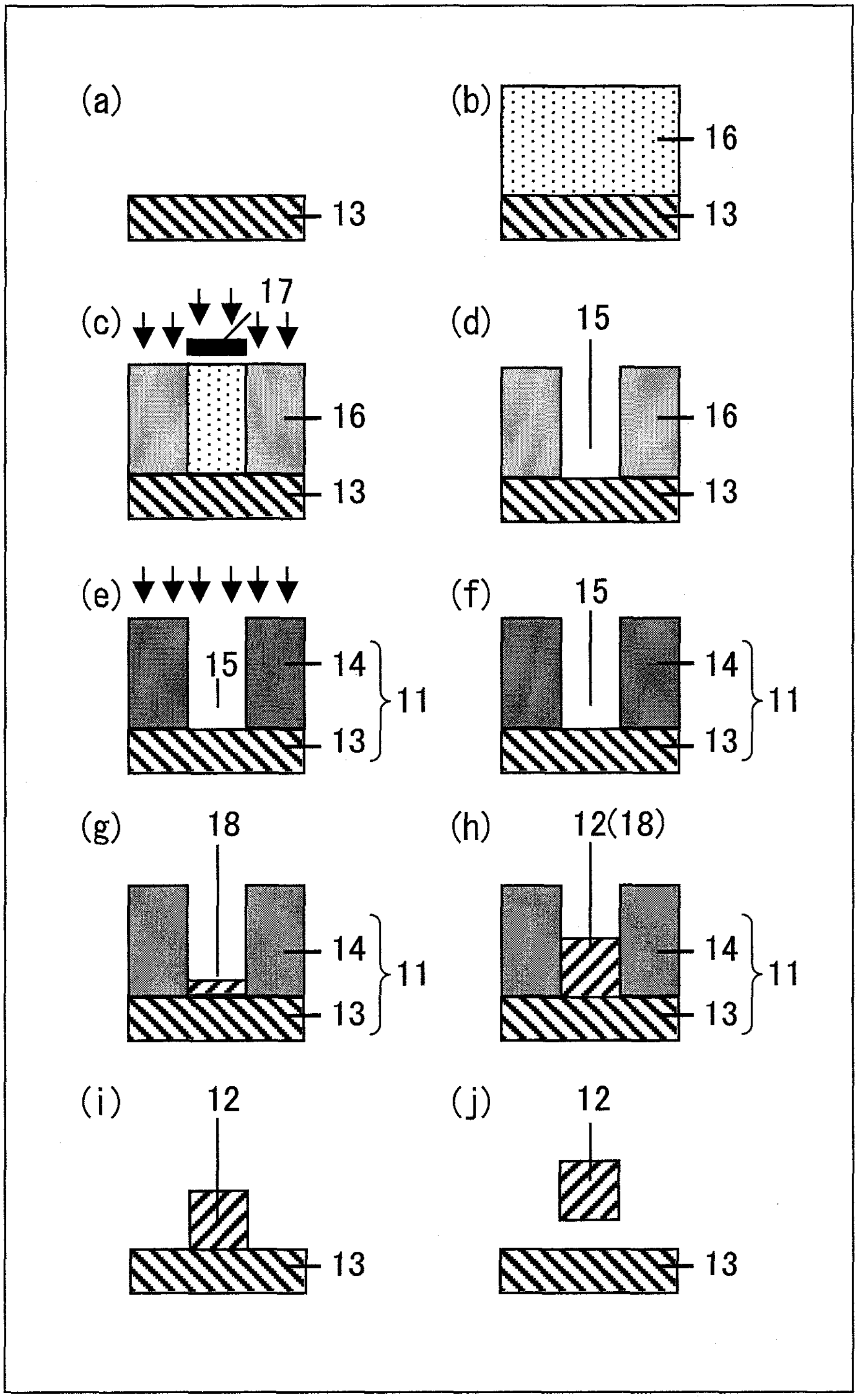
FIG. 1 is a set of cross-sectional views schematically showing steps of a process by which a composition for making a contact is cast by electroforming.

An embodiment of the present invention is described below in detail. It should be noted that the range "A to B" in this specification indicates "A or more to B or less". Further, all of the Non-patent and Patent Literatures named in this specification are used as references in this specification.

(1. Composition for Making a Contact)

A composition for making a contact according to one or more embodiments of the present invention includes: a nickel-cobalt alloy containing 20% by weight to 55% by weight of cobalt; and 0.002 part by weight to 0.02 part by weight of sulfur with respect to 100 parts by weight of the nickel-cobalt alloy, the composition having an average particle size of 0.10 μm to 0.35 μm, preferably 0.14 μm to 0.35 μm, or more preferably 0.23 μm to 0.35 μm.

The phrase "containing 20% by weight to 55% by weight of cobalt" means that the nickel-cobalt alloy contains 20% by weight to 55% by weight of cobalt atoms, and the phrase "containing 0.002 part by weight to 0.02 part by weight of sulfur" means that the composition contains 0.002 part by weight to 0.02 part by weight of sulfur atoms with respect to 100 parts by weight of the nickel-cobalt alloy.

The composition for making a contact is composed essentially of an nickel-cobalt alloy and sulfur, and by having the aforementioned cobalt content, sulfur content, and average particle size, exhibits excellence in spring bending elastic limit, in tensile strength, in conductivity, and in stress relaxation. As a result, a long stroke can be exhibited, and the occurrence of a creep can be sufficiently suppressed; therefore, the composition for making a contact excels, in particular, as a material for making a contact.

The composition for making a contact may contain only a nickel-cobalt alloy and sulfur, but may contain another component as long as the excellent spring bending elastic limit, tensile strength, conductivity, and stress relaxation of the composition for making a contact are not impaired. For example, the composition for making a contact may contain C, Cl, etc.

From a point of view of improving the spring bending elastic limit of the composition for making a contact, it is necessary that the nickel-cobalt alloy contain 20% by weight to 55% by weight of cobalt. As will be shown in the examples later, by containing a nickel-cobalt alloy containing 20% by weight to 55% by weight of cobalt and 0.002 part by weight to 0.02 part by weight of sulfur with respect to 100 parts by weight of the nickel-cobalt alloy, the composition for making a contact can exhibit a high spring bending elastic limit or, specifically, a spring bending elastic limit of 700 MPa or higher, which is equal to the spring bending elastic limit of phosphor bronze C5210-SH, which is used as a spring material for a common electronic part. This allows making a long-stroke contact with an improvement in maximum stress at which the material does not deform even after removal of a load.

Further, the composition for making a contact can exhibit a high tensile strength or, specifically, a tensile strength of 1300 MPa or higher, which is equal to the tensile strength of SUS301-H, which is used as a common high-strength spring material. This brings about an improvement in allowable stress, thus allowing preventing the contact from being damaged even in the case of repetition of attachment and detachment with a long stroke.

Furthermore, the composition for making a contact can exhibit a high conductivity or, specifically, a conductivity of 13% IACS or higher, which is equal to the conductivity of phosphor bronze C5210-SH, which is used as a spring material for a common electronic part. This brings about an improvement in power loss, thus allowing making a conductive contact having a long stroke.

The weight ratio between nickel and cobalt in the nickel-cobalt alloy can be confirmed, for example, by fluorescent X-ray spectrometry in conformity to DIN50987, ISO3497, and AST B568.

According to one or more embodiments of the present invention, the nickel-cobalt alloy is composed solely of nickel and cobalt; however, this does not imply any limitation. That is, although according to one or more embodiments of the present invention the nickel-cobalt alloy contains 20% by weight to 55% by weight of cobalt and the remaining component is nickel, the nickel-cobalt alloy may contain another component such as Na, Ca, Mg, Fe, Cu, Mn, Zn, Sn, Pd, Au, Ag, etc. in addition to nickel and cobalt to such an extent that the spring bending elastic limit of the composition for making a contact is not lowered. In this case, according to one or more embodiments of the present invention, the proportion of another component in the alloy is 0% by weight to 10% by weight.

The term "spring bending elastic limit" in this specification means the value of maximum stress of a surface of a fixed end of a sample to be measured that corresponds to an amount of permanent flexion displacement of 0.1 mm at a free end of the sample, at which maximum stress the material does not deform even after removal of a load.

The term "tensile strength" in this specification means stretching stress that would cause the material to tear when subjected to the stress. The allowable stress is determined by multiplying the tensile strength by a margin of safety. The term "margin of safety" here means a ratio between a stress that would cause the material to be destructed and a stress that allows the material to be used safely (obtained by dividing the former by the latter).

The term "conductivity" in this specification is a comparative value that represents what percent of conductivity a conducting wire has on the assumption that the conductivity of a standard annealed copper wire is 100%, and is an index by which the larger the value is, the easier electricity is allowed to travel.

Furthermore, the term "current interruption" in this specification means a momentary disruption of supply of power to an electric device, and the term "current interruption characteristic" means a characteristic of suppressing the occurrence of current interruption".

When the composition for making a contact contains a nickel-cobalt alloy containing less than 20% by weight of cobalt and less than 0.002 part by weight of sulfur with respect to 100 parts by weight of the nickel-cobalt alloy, the composition for making a contact may undesirably have a spring bending elastic limit of less than 700 MPa and a tensile strength of less than 1300 MPa.

When the composition for making a contact contains a nickel-cobalt alloy containing more than 55% by weight of cobalt, the resulting contact may undesirably have warpage. Further, when the composition for making a contact contains more than 0.02 part by weight of sulfur with respect to 100 parts by weight of the nickel-cobalt alloy, the sulfur does not dissolve in the electroforming solution during electroforming and therefore becomes colloidal, with the result that the solidified sulfur contained locally in the product causes a decrease in tensile strength.

For this reason, unless a special way of electroforming that dissolves sulfur is used, the sulfur atoms are contained in more than 0.02 part by weight, and a contact having uniform characteristics cannot be made. Therefore, one or more embodiments of the present invention exclude such an application.

As will be shown in the examples later, by containing a nickel-cobalt alloy containing 20% by weight to 55% by weight of cobalt and 0.002 part by weight to 0.02 part by weight of sulfur with respect to 100 parts by weight of the nickel-cobalt alloy, the composition for making a contact can exhibit a spring bending elastic limit of 700 MPa or higher, a tensile strength of 1300 MPa or higher, and a stress relaxation of 30% or lower, thus achieving long-stroke properties required of contacts.

From a point of view of preventing the occurrence of a creep based on a decrease in stress relaxation and keeping a high spring bending elastic limit, a high tensile strength, and a high conductivity, the composition for making a contact has its average particle size adjusted to 0.10 μm to 0.35 μm by heat treatment. This allows the composition for making a contact to have a stress relaxation of 30% or lower, which is equal to the stress relaxation of phosphor bronze C5210-SH, which is used as a spring material for a common electronic part, while keeping a high spring bending elastic limit, a high tensile strength, and a high conductivity. This allows the composition for making a contact to sufficiently prevent the occurrence of a creep.

When the composition for making a contact has its average particle size adjusted to 0.14 μm to 0.35 μm, the composition for making a contact can have a stress relaxation of 15% or lower, which is equivalent to ½ of the stress relaxation of phosphor bronze C5210-SH, while keeping a high spring bending elastic limit, a high tensile strength, and a high conductivity. Such a stress relaxation is one required of a spring material having a comparatively long stroke. This allows the composition for making a contact to sufficiently prevent the occurrence of a creep even when used with a long stroke.

When the composition for making a contact has its average particle size adjusted to 0.23 μm to 0.35 μm, the composition for making a contact can have a stress relaxation of 10% or lower, which is equal to the stress relaxation of SUS301-H, while keeping a high spring bending elastic limit, a high tensile strength, and a high conductivity. Such a stress relaxation is one required of a spring material having a long stroke. This allows the composition for making a contact to sufficiently prevent the occurrence of a creep even when used with an especially long stroke.

Stress relaxation is a value that depends on atomic diffusion. Therefore, stress relaxation is thought to be improved by making the average particle size larger to prevent grain boundary diffusion.

When the average particle size is less than 0.10 μm, there is such an undesirable tendency that a decrease in stress relaxation of the composition for making a contact leads to notable occurrence of a creep and therefore to an increase in residual strain. On the other hand, when the average particle size is more than 0.35 μm, there is such an undesirable tendency that the spring bending elastic limit and tensile strength of the composition for making a contact are decreased.

For example, Patent Literature 1 discloses that the nickel-cobalt alloy constituting the elastic terminal has an average particle size of 20 nm or smaller; however, as will be shown in the comparative examples later, the inventors of the present invention have confirmed that when a composition for making a contact has an average particle size of less than 0.10 μm, the occurrence of a creep based on a decrease in stress relaxation of the composition for making a contact cannot be suppressed. This is considered to be a reason why Patent Literature 1 had no choice but to shape the elastic terminal into a spiral to prevent a creep, and such a shape is thought to have rendered the elastic terminal low in versatility with a limited range of targets of connection.

On the other hand, because the composition for making a contact according to one or more embodiments of the present invention has an average particle size of 0.10 μm or larger to 0.35 μm or smaller, a decrease in stress relaxation can be suppressed. Furthermore, because the cobalt content and the sulfur content are within particular ranges, respectively, as mentioned above, the composition for making a contact can exhibit excellence in spring bending elastic limit, in tensile strength, and in conductivity. As such, the composition for making a contact can provide a highly versatile contact, which can sufficiently suppress the occurrence of a creep with a long stroke, which can secure long-term connection reliability, and which can be applied to a wide range of targets of connection. Therefore, the composition for making a contact can be said to have particularly excellent composition as a material for making a contact.

The term "particle size" in this specification is intended to mean the diameter of the maximum inscribed circle with respect to the two-dimensional shape of each crystal grain in the composition for making a contact as observed by a microscope. For example, when the two-dimensional shape of each crystal grain in the composition for making a contact is substantially circular, the particle size is intended to be the diameter of that circle, the minor diameter of that ellipse when substantially elliptical, the length of each side of that square when substantially square, or the length of each shorter side of that rectangle when substantially rectangular. Further, the term "average particle size" means an average of the particle sizes of a plurality of crystal grains in the composition for making a contact.

The average particle size can be measured, for example, by a focused ion beam scanning ion microscope (FIB-SIM). No particular limitations are placed on what type of FIB-SIM is used. However, in the examples to be described later, Further, a cross-section of the composition 1 was processed with a focused ion beam by using a focused ion beam scanning ion microscope (FB-2100, manufactured by Hitachi High-Technologies Corporation) as FIB-SIM. After that, the scanning ion microscope was used to observe crystal grains contained in an area of 10 μm×10 μm along a through-thickness direction from an electrodeposited surface of the composition for making a contact (with a magnification of 50000). Then, the average particle size was obtained by measuring the particle size of every crystal grain contained in the area in conformity to JIS-H0501 (cutting method) and calculating an average of the particle sizes thus measured.

Figure 7A:
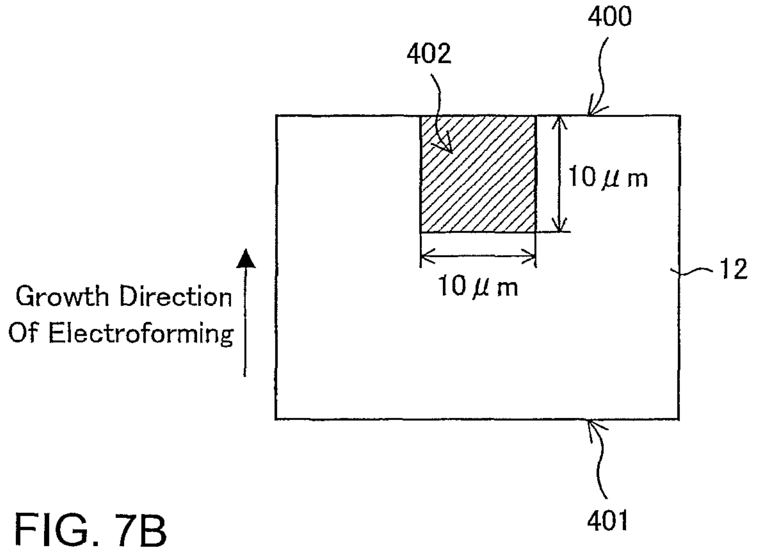
PRIOR ART FIG. 7A
FIG. 7 is a vertical cross-sectional view showing a region in which an observation of crystal grains is made in obtaining the average particle size of an electroformed composition for making a contact.
Figure 7B:
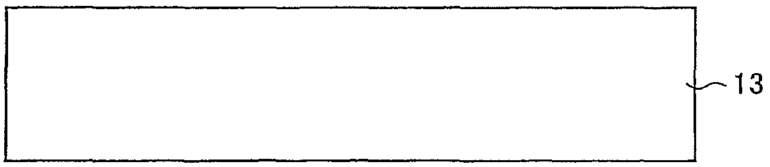

FIG. 7 is a vertical cross-sectional view showing a region in which the observation is made in obtaining the average particle size of an electroformed composition for making a contact. FIG. 7 shows a composition 12 for making a contact, a conducting base material 13, an electrodeposited surface 400 of the composition, a surface 401 of the composition that faces the base material, a site of measurement 402 in which the particles sizes of crystal grains are measured. The average particle size of the composition for making a contact is obtained by using as the site of measurement 402 of FIG. 7 a region having an area of 10 μm×10 μm, observing crystal grains contained in the site of measurement, measuring the particle sizes of every crystal grain contained in the area, and calculating an average of the particle sizes thus measured.

Although the site of measurement 402 is set to be an area of 10 μm×10 μm along a through-thickness direction from the electrodeposited surface 401 of the composition (through the thickness of the electroformed layer), it is not necessarily set in the middle of a vertical cross-section as shown in FIG. 7.

The "electrodeposited surface" is a surface of the electroformed layer (layer formed by electroforming) opposite to the surface 401 facing the base material, which is formed in the way electroforming proceeds.

An example of a method for determining the sulfur content of the composition for making a contact is a high-frequency induction furnace method with combustion control function in oxygen flow. The sulfur content can be determined, for example, by a method in conformity to JIS G1215.

No particular limitations are placed on a method for producing the composition for making a contact. For example, the composition for making a contact can be produced by heat-treating an electroformed layer made by electroforming. An example of a method for heat-treating an electroformed layer made by electroforming includes a method for heat-treating an electroformed layer obtained by electroforming with use of a plating solution containing nickel, cobalt, boric acid, a surface-active agent, a brightening agent, and a surface-smoothening agent.

The heat treatment allows the composition for making a contact to have its average particle size controlled to 0.10 μm or larger to 0.35 μm or smaller. Although the heat treatment is not to be particularly limited in terms of conditions, according to one or more embodiments of the present invention, the resulting electroformed layer is heated at 180° C. to 350° C. for 1 hour to 48 hours.

An example of conditions of the method for heat-treating an electroformed layer obtained by electroforming with use of a plating solution is to obtain a composition for making a contact by (a) obtaining an electroformed layer by electroforming in a plating solution with a pH of 3.0 to 5.0 containing 50 g/L to 130 g/L of nickel, 9 g/L to 42 g/L of cobalt, 20 g/L to 40 g/L of boric acid, 0.02% by weight to 1% by weight of a surface-active agent, and a total of 0.01% by weight to 1% by weight of a brightening agent and a surface-smoothening agent, at an electric current density of 1 $A/dm^2$ to 12 $A/dm^2$ and a solution temperature of 40° C. to 65° C. with use of a DC power source and (b) heating the resulting electroformed layer at 180° C. to 350° C. for 1 hour to 48 hours. The heat treatment allows the composition for making a contact to have its average particle size controlled to 0.10 μm or larger to 0.35 μm or smaller.

Further, by heating the resulting electroformed layer at 230° C. to 350° C. for 1 hour to 48 hours, the average particle size of the composition for making a contact can be controlled to 0.14 μm or larger to 0.35 μm or smaller.

Furthermore, by heating the resulting electroformed layer at 250° C. to 350° C. for 1 hour to 48 hours, the average particle size of the composition for making a contact can be controlled to 0.23 μm or larger to 0.35 μm or smaller.

The heating can be carried out, for example, by leaving the electroformed layer for 1 to 48 hours in a constant-temperature bath whose inner temperature has been kept at the heating temperature (e.g., 180 to 350° C.).

Usable examples of the plating solution include a NiCo sulfamic acid bath, etc. Usable examples of the surface-active agent include, but are not to be particularly limited to, sodium lauryl sulfate, polyoxyethylene lauryl ether, dodecyltrimethylammonium chloride, etc.

Further, usable examples of the brightening agent include, but are not to be particularly limited to, 1,5-sodium naphthalenedisulfonate, 1,3,6-sodium naphthalenetrisulfonate, saccharin, para-toluenesulfonamide, etc.

Usable examples of the surface-smoothening agent include, but are not to be particularly limited to, 2-butyne-1, 4-diol, propargylic alcohol, coumarin, ethylene cyanohydrin, thiourea, etc.

The surface-active agent, the brightening agent, and the surface-smoothening agent may each be used alone or in combination of two or more types thereof.

The phrase "containing a total of 0.01% by weight to 5% by weight of a brightening agent and a surface-smoothening agent" means that a total of 0.01% by weight to 5% by weight of the brightening agent and the surface-smoothening agent is contained in the plating solution. The ratio between the brightening agent and the surface-smoothening agent is not to be particularly limited.

In the following, an example of a set of steps of the electroforming is described with reference to FIG. 1. FIG. 1 is a set of cross-sectional views schematically showing steps of a process by which a composition for making a contact is produced by electroforming. A matrix 11 is obtained by laminating a thick insulating layer 14 on a flat upper surface of the conducting base material 13, and the insulating layer 14 is provided with a cavity 15 (recessed area) having a shape of a reversed pattern of the composition 12 for making a contact. The cavity 15 has no insulating layer 14 left on its bottom surface, and the conducting base material 13 has its upper surface exposed by the bottom surface of the cavity 15 as a whole.

In the cavity 15 of the matrix 11, the composition 12 is formed by electroforming. Usable examples of the conducting base material 13 include, but are not to be particularly limited to, conventional publicly-known copper (e.g., tough pitch copper C1100 manufactured by HARADA METAL INDUSTRY Co., Ltd., etc.), SUS (e.g., SUS304 manufactured by HAKUDO Corporation, etc.), etc.

In the following, steps of a process by which the composition 12 is produced by using the matrix 11 are described. FIG. 1 shows steps of a process by which the composition 12 is produced by electroforming. (a) through (f) of FIG. 1 show a step (matrix-forming step) of forming the matrix 11. (g) and (h) of FIG. 1 show a step (electrodepositing step) of producing the composition 12 by electrodepositing metal in the cavity 15. (i) and (j) of FIG. 1 show a step (removing step) of removing the composition 12 from the matrix 11.

In actuality, the matrix 11 is provided with a plurality of cavities 15 so that a plurality of compositions 12 for making a contact are produced at one time. However, for convenience sake, a case where a single composition 12 for making a contact is produced is described.

(a) of FIG. 1 shows a conducting base material 13, made of metal, whose upper surface is flat, and the conducting base material 13 has at least its upper surface treated so that a composition 12 electrodeposited thereon can be easily removed. In the matrix-forming step, first, as shown in (b) of FIG. 1, a dry film photoresist 16 is laminated on the upper surface of the conducting base material 13 by a laminator.

Next, as shown in (c) of FIG. 1, the dry film photoresist 16 is exposed with a mask 17 covering a region of the dry film photoresist 16 in which a cavity 15 is formed. Because the exposed region of the dry film photoresist 16 becomes insoluble and therefore does not dissolve during development, only the region covered with the mask 17 is dissolved and removed by development, whereby a cavity 15 is formed in the dry film photoresist 16 as shown in (d) of FIG. 1.

Finally, as shown in (e) of FIG. 1, the dry film photoresist 16 is further exposed to form an insulating layer 14 having a predetermined thickness on the upper surface of the conducting base material 13. The matrix 11 thus obtained is shown in (f) of FIG. 1.

Suitably usable examples of the dry film photoresist 16 include, but are not to be particularly limited to, FRA517 and SF100 manufactured by DuPont MRC, HM-4056 manufactured by Hitachi Chemical Co., Ltd., NEF150K and NIT215 manufactured by Nichigo-Morton, etc.

Although only the upper surface of the conducting base material 13 is covered with the insulating layer 14 in FIG. 1, the conducting base material 13, in actuality, has its lower and side surfaces covered with an insulating layer so that no metal is electrodeposited outside of the cavity 15.

Figure 2:
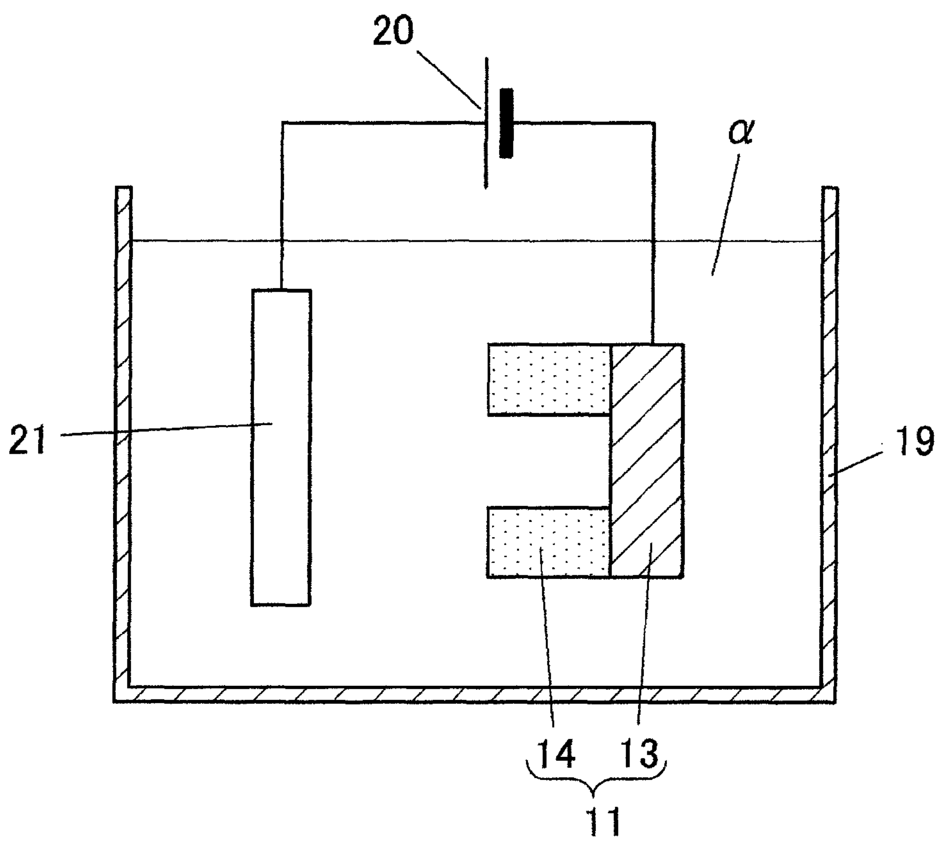
FIG. 2 is a cross-sectional view showing a matrix placed in an electrolytic cell.

FIG. 2 is a cross-sectional view showing a matrix placed in an electrolytic cell. As shown in FIG. 2, the electrodepositing step includes placing the matrix 11 in an electrolytic cell 19, applying a voltage between the matrix 11 and a counter electrode 21 through a DC power source 20, and passing an electric current through a plating solution α.

According to one or more embodiments of the present invention, in order for the resulting composition 12 to contain a nickel-cobalt alloy containing 20% by weight to 55% by weight of cobalt and 0.002 part by weight to 0.02 part by weight of sulfur with respect to 100 parts by weight of the nickel-cobalt alloy, the plating solution α contains 50 to 130 g/L of nickel, 9 to 42 g/L of cobalt, 20 to 40 g/L of boric acid, 0.02% by weight to 0.5% by weight of a surface-active agent, and a total of 0.01% by weight to 1% by weight of a brightening agent and a surface-smoothening agent and has a pH of 3.0 to 5.0.

Upon the start of conduction, the metal ions in the plating solution α are electrodeposited on the surface of the conducting base material 13, whereby a metal layer 18 is deposited. On the other hand, because the insulating layer 14 stops an electric current from passing therethrough, no metal is electrodeposited directly on the insulating layer 14 even when a voltage is applied between the matrix 11 and the counter electrode 21. For this reason, as shown in (g) of FIG. 1, the metal layer 18 grows inside of the cavity 15 from the bottom surface in the direction of voltage application (i.e., in the way electroforming proceeds).

Figure 3:
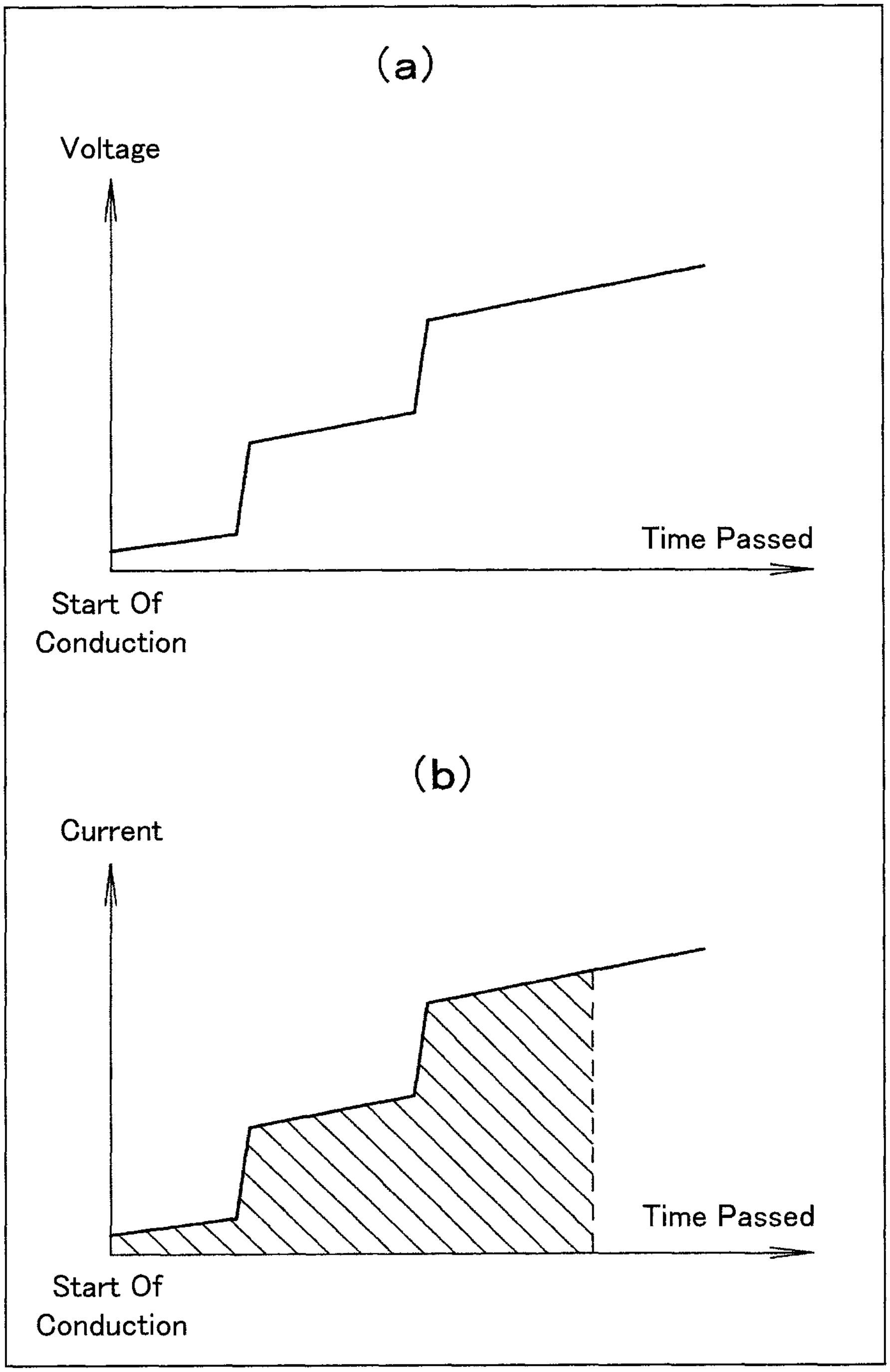
FIG. 3 shows (a) changes in voltage that is applied between the electrodes of the electrolytic cell and (b) changes in electric current that is passed through the electrolytic cell.

The thickness of the metal layer 18 (composition 12 for making a contact) thus electrodeposited is controlled by the integrated amount of the electric current passed (i.e., the time-integrated amount of the electric current passed, which corresponds to the area of the shaded region in (b) of FIG. 3). The reason for this is as follows: because the amount of metal that is deposited per unit time is proportional to the value of an electric current, the volume of the metal layer 18 depends on the integrated amount of the electric current passed, and the thickness of the metal layer 18 can be determined from the integrated amount of the electric current passed.

FIG. 3 shows (a) changes in voltage that is applied between the electrodes of the electrolytic cell and (b) changes in electric current that is passed through the electrolytic cell. For example, assuming that the voltage of the DC power source 20 gradually increases as shown in (a) of FIG. 3 as time passes after the start of conduction, the electric current flowing between the counter electrode 21 and the matrix 11 also gradually increases as shown in (b) of FIG. 3 as time passes after the start of conduction. Then, when reaching of the intended thickness by the metal layer 18 has been detected by monitoring the integrated amount of the electric current passed, the DC power source 20 is turned off to stop conduction. In the result, as shown in (h) of FIG. 1, a composition 12 for making a contact is cast in the cavity 15 by the metal layer 18 having the desired thickness.

Once the composition 12 has been cast, the insulating layer 14 is removed by etching or the like as shown in (i) of FIG. 1, and the composition 12 is removed from the conducting base material 13 as shown in (j) of FIG. 1, whereby the composition 12 is obtained in the form of a reversal of the shape of the matrix 11. The composition 12 thus obtained is heat-treated to have an average particle size of 0.10 μm or larger to 0.35 μm or smaller. In the result, the composition for making a contact according to one or more embodiments of the present invention can be obtained.

It should be noted here that a contact according to one or more embodiments of the present invention to be described later can be made by forming the cavity 15 in advance into the shape of the contact. The shape of the contact is not to be particularly limited. The composition for making a contact according to one or more embodiments of the present invention can sufficiently suppress the occurrence of a creep and therefore can easily provide a contact in a desired shape without the need to take a unique shape such as a spiral shape to suppress the occurrence of a creep.

(2. Contact)

A contact according to one or more embodiments of the present invention includes: a retaining section fixed by an insulator; a contact section which makes sliding contact with a conductive member; and an elastic deformation section which connects the retaining section and the contact section to each other and which is elastically deformable, at least the elastic deformation section containing a composition for making a contact according to one or more embodiments of the present invention.

Figure 4:
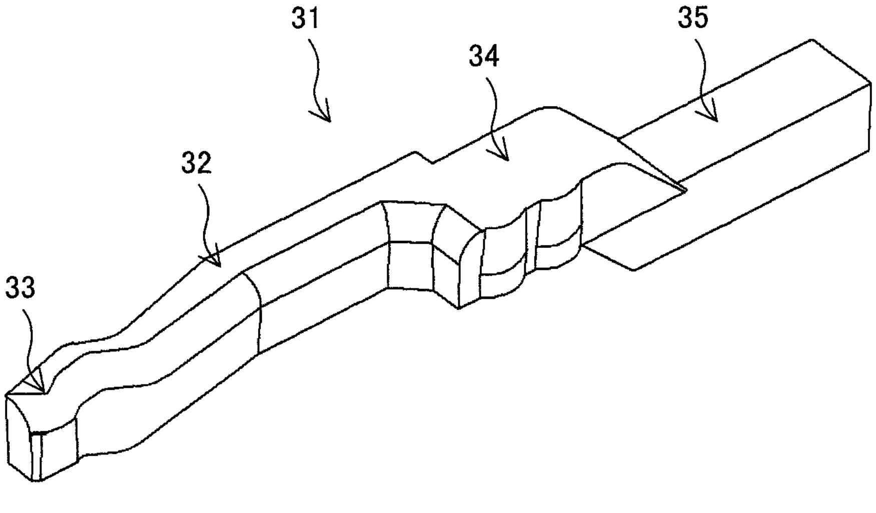
FIG. 4 is an appearance perspective view showing an example of the appearance of a contact according to one or more embodiments of the present invention.

FIG. 4 is an appearance perspective view showing an example of the appearance of a contact according to one or more embodiments of the present invention. In FIG. 4, the contact 31 includes an elastic deformation section 32, a contact section 33, a retaining section 34, and an electrode section 35. Because the elastic deformation section 32 contains a composition for making a contact according to one or more embodiments of the present invention, the elastic deformation section 32 exhibits a long stroke and sufficiently suppresses the occurrence of a creep.

Therefore, the contact 31 has a high level of vibration followability and keeps a satisfactory level of contact over a long period of time with a conductive member to which it is connected. Further, the contact 31 does not need to take a unique shape such as a spiral shape and can take any shape for any purpose, and as such, can be connected to a variety of conductive members.

The elastic deformation section 32 may be composed solely of a composition for making a contact according to one or more embodiments of the present invention or may contain another component as long as the spring bending elastic limit, stress relaxation, conductivity, and tensile strength of the elastic deformation section 32 are not impaired. Examples of cases where the elastic deformation section 32 contains another component include a case where the elastic deformation section 32 has its surface plated with another metal and a case where the elastic deformation section 32 contains the aforementioned surface-active agent, brightening agent, surface-smoothening agent, etc.

Because, in the contact 31, at least the elastic deformation section 32 needs only contain a composition for making a contact according to one or more embodiments of the present invention, the contact section 33 and the retaining section 34 may each be composed of a component not containing a composition for making a contact according to one or more embodiments of the present invention. For example, the contact section 33 and the retaining section 34 may each be composed, for example, of Fe, Cu, Mn, Zn, Sn, Pd, Au, or Ag, etc.

As such, the elastic deformation section 32 may be made of a different material from the contact section 33 and the retaining section 34. However, in a case where the contact 31 is made by electroforming according to one or more embodiments of the present invention, it is preferable, from a point of view of simplification of making, that the elastic deformation section 32, the contact section 33, and the retaining section 34 are made of an identical material, so that the elastic deformation section 32, the contact section 33, and the retaining section 34 can be integrally formed at one time as shown in FIG. 4.

The elastic deformation section 32 connects the contact section 33 and the retaining section 34 to each other. This "connection" includes, for example, a case where the elastic deformation section 32, the contact section 33, and the retaining section 34 are integrally formed by an identical material as shown in FIG. 4 and a case where the elastic deformation section 32 is joined by a technique such as welding to the contact section 33 and the retaining section each composed of a component not containing a composition for making a contact according to one or more embodiments of the present invention.

Figure 5:
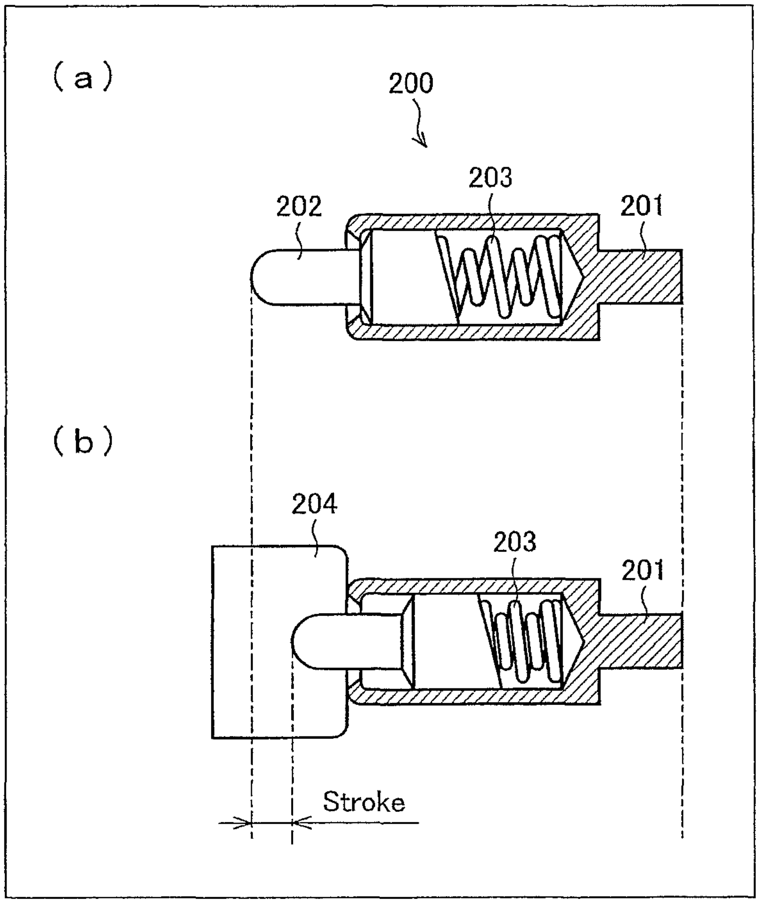
FIG. 5 is a vertical cross-sectional view showing an example of a contact of a common battery connector.
Figure 6:
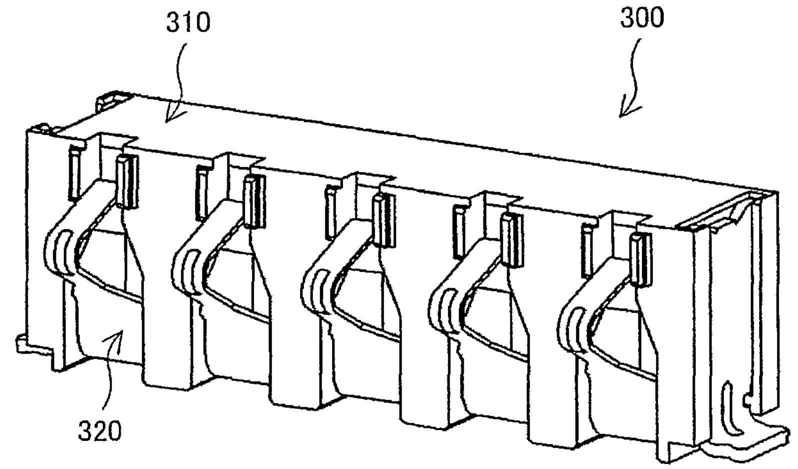
FIG. 6 is an appearance perspective view showing an example of the appearance of a conventional publicly-known battery connector.

The term "elastically deformable" means that the elastic deformation section 32 is predisposed to recover from a strain caused by application of external force. The elastic deformation section 32 is not to be particularly limited in shape. For example, the elastic deformation section 32 may take such a shape as that shown in FIG. 4, may take a spring shape as does the elastic deformation section 203 of FIG. 5, or may take a leaf shape as in a contact 320 of FIG. 6. Further, the direction of elastic deformation is not to be particularly limited. It should be noted that FIG. 6 is an appearance perspective view showing an example of the appearance of a conventional publicly-known battery connector 300 including a connector housing 310 made of an insulator and contacts 320.

The elastic deformation section 32 is biased toward elastic deformation when the contact section 33 makes sliding contact with a conductive member to which the contact 31 is connected, and retains the connection between the contact 31 and the conductive member. Because the contact 31 can take any shape for any purpose and can be connected to a variety of conductive members, the conductive member is not to be particularly limited. Examples of the conductive member include an electrode of a battery, a connection part of a substrate, etc.

According to one or more embodiments of the present invention, the contact 31 is configured such that the composition according to one or more embodiments of the present invention contained in the elastic deformation section is one obtained by heat-treating an electroformed layer made by electroforming.

The contact 31 may for example be a contact, formed by bending a metal plate made of a composition for making a contact according to one or more embodiments of the present invention, whose elastic force has been adjusted by partly changing the thickness by press working. However, such press working causes residual stress, lattice defects, etc. to occur to result in deterioration in mechanical properties, and this may shorten the life of a connector including the contact 31 or cause variations in elastic force from product to product (Japanese Patent Application Publication, Tokukai, No. 2008-262780).

On the other hand, because electroforming is an electrochemical reaction and is a technique for causing a metal to be deposited electrically, a contact having a uniform structure can be made without the occurrence of residual stress, lattice defects, etc. Further, unlike a method such as cutting work, electroforming allows a desired shape to be formed simply by forming a reversed pattern of the shape of a contact in the aforementioned cavity. For example, by forming a reversed pattern of a shape extending along a direction substantially perpendicular to the direction of voltage application of electroforming, the contact can be made shorter along a direction in which it is fitted. This brings about an advantage of making the contact smaller in size.

According to one or more embodiments of the present invention, a method for making a contact by electroforming includes the step of heat-treating an electroformed layer made by electroforming. An example of the method is a method including: (a) obtaining an electroformed layer in the shape of a contact by carrying out the method of FIG. 1 with use of (i) a plating solution with a pH of 3.0 to 5.0 prepared to contain 50 to 130 g/L of nickel, 9 to 42 g/L of cobalt, 20 to 40 g/L of boric acid, 0.02% by weight to 0.5% by weight of a surface-active agent, and a total of 0.01% by weight to 1% by weight of a brightening agent and a surface-smoothening agent in order that a composition for making a contact according to one or more embodiments of the present invention contains a nickel-cobalt alloy containing 20% by weight to 55% by weight of cobalt and 0.002 part by weight to 0.02 part by weight of sulfur with respect to 100 parts by weight of the nickel-cobalt alloy and (ii) a cavity having a reversed pattern of a desired shape; and (b) heating the electroformed layer at 180 to 350° C. for 1 to 48 hours.

The unit "g/L" of the amounts of nickel, cobalt, and boric acid added represents the number of grams of nickel, cobalt, and boric acid contained in 1 L of the plating solution, respectively. The unit "% by weight" of the amount of the surface-active agent represents the percent by weight of the surface-active agent with respect to the weight of a solid content contained in the plating solution, and the unit "% by weight" of the amount of the brightening agent and the surface-smoothening agent represents the percent by weight of a total amount of the brightening agent and the surface-smoothening agent with respect to the weight of the solid content contained in the plating solution.

(3. Connector)

A connector according to one or more embodiments of the present invention includes a contact according to one or more embodiments of the present invention. The connector is not to be particularly limited, and can be used as a connector for various purposes. Examples of connectors include battery connectors, connectors for computer use such as USB connectors, connectors for communication use such as DS connectors, audiovisual connectors such as phone connectors, power connectors such as AC power connectors, coaxial connectors for connecting coaxial cables, optical connectors for connecting optical cables, etc.

The contact included in the connector according to one or more embodiments of the present invention includes a composition for making a contact according to one or more embodiments of the present invention, and the composition exhibits excellence in spring bending elastic limit, in tensile strength, in conductivity, and in stress relaxation, and as such, can exhibit a long stroke and sufficiently suppress the occurrence of a creep. Therefore, the connector can be used, regardless of application, as a connector, which has a high level of vibration followability, which has an improved current interruption characteristic, and which can secure long-term connection reliability. In particular, the connector can maintain its current interruption characteristic over a long period of time even when it is constantly exposed to a preload, and as such, according to one or more embodiments of the present invention, can be used as a battery connector.

The connector needs to only include a contact according to one or more embodiments of the present invention, and can include another component that has conventionally been publicly known. For example, the connector may include a connector housing, etc., made of a conventional publicly-known insulator, which serves to fix the retaining section of the contact. Further, a method for making such a connector is not to be particularly limited, and the connector can be made by a conventional publicly-known method.

It should be noted that embodiments of the present invention can also be expressed as follows:

That is, a composition for making a contact according to one or more embodiments of the present invention includes: a nickel-cobalt alloy containing 20% by weight to 55% by weight of cobalt; and 0.002 part by weight to 0.02 part by weight of sulfur with respect to 100 parts by weight of the nickel-cobalt alloy, the composition having an average particle size of 0.14 μm to 0.35 μm.

By adjusting the average particle size to 0.14 μm to 0.35 μm, the stress relaxation can be improved without lowering the spring bending elastic limit and the tensile strength. Therefore, the composition can be suitably used as a material for achieving a contact, which can exhibit a long stroke, which can sufficiently suppress the occurrence of a creep, and which has excellent versatility.

That is, a composition for making a contact according to one or more embodiments of the present invention includes: a nickel-cobalt alloy containing 20% by weight to 55% by weight of cobalt; and 0.002 part by weight to 0.02 part by weight of sulfur with respect to 100 parts by weight of the nickel-cobalt alloy, the composition having an average particle size of 0.23 μm to 0.35 μm.

By adjusting the average particle size to 0.23 μm to 0.35 μm, the stress relaxation can be improved without lowering the spring bending elastic limit and the tensile strength. Therefore, the composition can be suitably used as a material for achieving a contact, which can exhibit a long stroke, which can sufficiently suppress the occurrence of a creep, and which has excellent versatility.

A contact according to one or more embodiments of the present invention is configured to include: a retaining section fixed by an insulator; a contact section that makes sliding contact with a conductive member; and an elastic deformation section that connects the retaining section and the contact section to each other and that is elastically deformable, at least the elastic deformation section containing a composition for making a contact according to one or more embodiments of the present invention.

According to the configuration, at least the elastic deformation section contains a composition for making a contact according to one or more embodiments of the present invention. This makes it possible to provide a contact that does not need to take a spiral shape to sufficiently suppress the occurrence of a creep and exhibit a long stroke. This in turn makes it possible to provide a contact that can take any shape for any purpose and can therefore be used in a variety of targets of connection, and that has improved vibration followability to keep a satisfactory level of contact over a long period of time.

The contact according to one or more embodiments of the present invention is configured such that the composition for making a contact according to one or more embodiments of the present invention is one obtained by heat-treating an electroformed layer made by electroforming.

The contact according to one or more embodiments of the present invention is configured such that the composition for making a contact according to one or more embodiments of the present invention is one obtained by heat-treating, at 180 to 350° C. for 1 to 48 hours, an electroformed layer made by electroforming.

Unlike a method such as press working, for example, electroforming allows an adjustment of elastic force of a metal plate without causing variations in elastic force from product to product dues to the occurrence of residual stress, lattice defects, etc. Further, electroforming makes it comparatively easy to make a small-sized contact. Furthermore, the heat treatment allows the composition for making a contact to have its average particle size adjusted to 0.10 μm to 0.35 μm.

Therefore, the foregoing configuration makes it possible to provide a homogeneous, small-sized, and long-life contact, which can exhibit a long stroke, which can sufficiently suppress the occurrence of a creep, and which has excellent versatility.

A connector according to one or more embodiments of the present invention includes a contact according to one or more embodiments of the present invention. The contact according to one or more embodiments of the present invention does not need to take a spiral shape to exhibit a long stroke and sufficiently suppress the occurrence of a creep. Therefore, the foregoing configuration makes it possible to provide a connector that has excellent versatility and that can keep a satisfactory level of contact over a long period of time. For example, the contact according to one or more embodiments of the present invention is effective as a connector contact, having the shape of a plate spring, such as an FPC connector, a substrate-to-substrate connector, a substrate-to-FPC connector, a battery connector, etc.

The connector according to one or more embodiments of the present invention is a battery connector. The battery connector, which is used to connect a power source and a main body to each other, has been required to have such characteristics that it can be made small in size and gives a satisfactory state of contact, along with a reduction in thickness of a small-sized portable device such as a cellular phone. A contact for use in the connector according to one or more embodiments of the present invention can take any shape for any purpose, can yet exhibit a long stroke and sufficiently suppress the occurrence of a creep, and can also be made small in size. As such, the contact can provide a battery connector that can satisfy the above characteristics.

A method for making a contact according to one or more embodiments of the present invention includes the step of heat-treating an electroformed layer made by electroforming.

A method for making a contact according to one or more embodiments of the present invention includes: an electroforming step of obtaining an electroformed layer by electroforming in a plating solution with a pH of 3.0 to 5.0 containing 50 to 130 g/L of nickel, 9 to 42 g/L of cobalt, 20 to 40 g/L of boric acid, 0.02% by weight to 0.5% by weight of a surface-active agent, and a total of 0.01% by weight to 1% by weight of a brightening agent and a surface-smoothening agent; and a heating step of heating the electroformed layer at 180 to 350° C. for 1 to 48 hours.

The foregoing configuration gives an electroformed layer containing a nickel-cobalt alloy containing 20% by weight to 55% by weight of cobalt and 0.002 part by weight to 0.02 part by weight of sulfur with respect to 100 parts by weight of the nickel-cobalt alloy, and the heating makes it possible to obtain a contact having an average particle size of 0.10 μm to 0.35 μm.

This makes it possible to easily provide a homogeneous, small-sized, and long-life contact, which can exhibit a long stroke, which can sufficiently suppress the occurrence of a creep, and which has excellent versatility.

EXAMPLES

In the following, embodiments of the present invention are described in more detail with reference to examples. It should be noted, however, that embodiments of the present invention are not to be limited to the following examples.

Example 1

SUS304 (manufactured by HAKUDO Corporation) was used as a conducting base material made of SUS. On a surface of the conducting base material, NEF150K manufactured by Nichigo-Morton Co., Ltd. was evenly laminated as a dry film photoresist by using a laminator. The photoresist was exposed with a mask pattern as a mask and developed. After that, the photoresist was further exposed, whereby a matrix having a mask pattern (reversed pattern) was formed.

As a NiCo plating solution, a plating solution with a pH of 3.6 to 4.3 containing 436 to 545 g/L (Ni=90 to 100 g/L) of sulfamic acid Ni (NS-160, manufactured by Showa Chemical Industry Co., Ltd.), 49 to 82 g/L (Co=9 to 15 g/L) of 60% sulfamic acid Co (manufactured by Showa Chemical Industry Co., Ltd.), 20 to 40 g/L of boric acid (manufactured by Showa Chemical Industry Co., Ltd.), 0.02 to 0.1% by weight of a surface-active agent, and 0.01 to 0.1% by weight of saccharin was used. A plating bath was prepared by filling an electrolytic cell with the plating solution.

The matrix was placed in the electrolytic cell, and electroforming was carried out with the plating bath set at a temperature of 55 to 65° C. and at an electric current density of 6 to 9 $A/dm^2$. After that, the resulting electroformed layer was taken out from the electrolytic cell, placed into a constant-temperature bath whose inner temperature had been kept at 180 to 220° C., and heat-treated by being left in the constant-temperature bath for 1 to 5 hours, whereby a composition 1 for making a contact was obtained.

The results of the examples and comparative examples are shown in Tables 1 to 3. As shown in Table 1, the composition 1 thus obtained contained a nickel-cobalt alloy containing 20% by weight of cobalt and 80% by weight of nickel and 0.002 part by weight of sulfur with respect to 100 parts by weight of the nickel-cobalt alloy. The composition 1 had an average particle size of 0.10 μm. It should be noted that "Proportion of Co in Alloy (wt %)" in Tables 1 to 3 indicates the percent by weight of cobalt in the nickel-cobalt alloy contained in the composition 1.

The weight ratio between nickel and cobalt of the nickel-cobalt alloy contained in the composition 1 was measured by using a fluorescent X-ray spectrometer (XDV-SD, manufactured by Fischer Instruments K.K.), and the sulfur and carbon contents of the composition 1 were measured by using EMIA-920V manufactured by Horiba, Ltd.

Further, a cross-section of the composition 1 was processed with a focused ion beam by using a focused ion beam scanning ion microscope (FB-2100, manufactured by Hitachi High-Technologies Corporation). After that, as shown in FIG. 7, the scanning ion microscope was used to observe crystal grains in an area of 10 μm×10 μm along a through-thickness direction from an electrodeposited surface of the composition 1 (with a magnification of 50000).

Then, the average particle size was obtained by measuring particle sizes in conformity to JIS-H0501 (cutting method) and calculating an average of the particle sizes thus measured. In the examples and comparative examples below, the weight ratio between nickel and cobalt, the sulfur and carbon contents, and the way of obtaining the average particle size are identical to those of Example 1.

As shown in Table 1, the composition 1 thus obtained had a spring bending elastic limit of 849 MPa, a tensile strength of 1732 MPa, a conductivity of 14% IACS, and a stress relaxation of 28%. With a spring bending elastic limit of 700 MPa or higher and a tensile strength of 1300 MPa or higher, a long stroke can be achieved, so that the resulting contact can be given a high level of vibration followability. Further, with a stress relaxation of 30% or lower, it can be said that the occurrence of a creep is sufficiently suppressed, so that the resulting contact can be given long-term connection reliability. Furthermore, with a conductivity of 13% IACS or higher, electricity is allowed to travel with low heat generation, because such a conductivity is equal to that of phosphor bronze C53210, which is used in a common conducting contact.

Therefore, Tables 1 to 3 use the following criteria: a spring bending elastic limit of 700 MPa or higher; a tensile strength of 1300 MPa or higher; a conductivity of 13% IACS or higher; and a stress relaxation of 30% or lower.

In should be noted that in each of the examples and comparative examples, the spring bending elastic limit was measured in conformity to JIS H3100 by using a spring bending elastic limit tester (APT, manufactured by Akashi Corporation). The tensile strength was measured by carrying out a tensile test in conformity to JIS Z2241 by using a precision universal tester Autograph (AG-X, manufactured by Shimadzu Corporation) and a video noncontact extensometer (DVE-201, manufactured by Shimadzu Corporation). The conductivity was measured in conformity to JIS H0505 by using a resistance measurement machine (E5, manufactured by NPS). The stress relaxation was measured in conformity to JCBA T309.

Further, warpage in each composition was detected by using the same method as the JIS G3193 method for detecting lateral bending of a steel plate. Each sample of composition was judged to be "warped" when it had a difference of 0.1 mm or greater across a width of 150 mm. Each composition was appraised as OK when none of the five observed pieces of composition was judged to be warped.

TABLE 1

| | Criteria | Example 1 | Example 2 | Example 3 | Example 4 | Example 5 | Example 6 | Example 7 | Example 8 |
|---|---|---|---|---|---|---|---|---|---|
| Proportion of Co in Alloy (wt %) | | 20 | 20 | 20 | 20 | 20 | 20 | 20 | 20 |
| Sulfur Content (Parts by weight) | | 0.002 | 0.002 | 0.002 | 0.002 | 0.020 | 0.020 | 0.020 | 0.020 |
| Average Particle Size (μm) | | 0.10 | 0.14 | 0.23 | 0.35 | 0.10 | 0.14 | 0.23 | 0.35 |
| Spring Elastic Bending Limit (MPa) | ≥700 | 849 | 791 | 743 | 715 | 854 | 798 | 738 | 721 |
| Tensile Strength (MPa) | ≥1300 | 1732 | 1522 | 1408 | 1371 | 1752 | 1545 | 1448 | 1403 |
| Conductivity (% IACS) | ≥13% | 14 | 16 | 16 | 16 | 14 | 16 | 16 | 16 |
| Stress Relaxation (%) | ≤30% | 28 | 15 | 10 | 5 | 25 | 14 | 9 | 5 |
| Warpage (OK: piece(s)/5 pieces | 5/5 | 5/5 | 5/5 | 5/5 | 5/5 | 5/5 | 5/5 | 5/5 | 5/5 |

TABLE 2

| | Criteria | Example 9 | Example 10 | Example 11 | Example 12 | Example 13 | Example 14 | Example 15 | Example 16 |
|---|---|---|---|---|---|---|---|---|---|
| Proportion of Co in Alloy (wt %) | | 55 | 55 | 55 | 55 | 55 | 55 | 55 | 55 |
| Sulfur Content (Parts by weight) | | 0.002 | 0.002 | 0.002 | 0.002 | 0.020 | 0.020 | 0.020 | 0.020 |
| Average Particle Size (μm) | | 0.10 | 0.14 | 0.23 | 0.35 | 0.10 | 0.14 | 0.23 | 0.35 |
| Spring Elastic Bending Limit (MPa) | ≥700 | 851 | 811 | 766 | 711 | 854 | 803 | 782 | 725 |
| Tensile Strength (MPa) | ≥1300 | 1765 | 1608 | 1421 | 1388 | 1720 | 1598 | 1482 | 1415 |
| Conductivity (% IACS) | ≥13% | 14 | 16 | 16 | 16 | 14 | 16 | 16 | 16 |
| Stress Relaxation (%) | ≤30% | 23 | 13 | 9 | 5 | 21 | 14 | 10 | 5 |
| Warpage (OK: piece(s)/5 pieces | 5/5 | 5/5 | 5/5 | 5/5 | 5/5 | 5/5 | 5/5 | 5/5 | 5/5 |

TABLE 3

| | Criteria | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Proportion of Co in Alloy (wt %) | | 8 | 65 | 20 | 20 | 20 | 20 | — | — |
| Sulfur Content (Parts by weight) | | 0.005 | 0.005 | 0.001 | 0.021 | 0.005 | 0.005 | — | — |
| Average Particle Size (μm) | | 0.23 | 0.12 | 0.26 | 0.11 | 0.09 | 0.36 | — | — |
| Spring Elastic Bending Limit (MPa) | ≥700 | 630 | — | 324 | 720 | 780 | 698 | 678 | 490 |
| Tensile Strength (MPa) | ≥1300 | 1177 | — | 978 | 500 | 1831 | 1226 | 814 | 1320 |
| Conductivity (% IACS) | ≥13% | 16 | — | 16 | 14 | 13 | 16 | 13 | 5 |
| Stress Relaxation (%) | ≤30% | 33 | — | 27 | 28 | 31 | 6 | 30 | 10 |
| Warpage (OK: piece(s)/5 pieces | 5/5 | 5/5 | 0/5 | 5/5 | 5/5 | 5/5 | 5/5 | — | — |

Example 2

Electroforming was carried out with a plating solution identical in condition to that of Example 1 by using a matrix identical to that of Example 1. After that, the resulting electroformed layer was taken out from the electrolytic cell, placed into a constant-temperature bath whose inner temperature had been kept at 230 to 250° C., and heat-treated by being left in the constant-temperature bath for 1 to 5 hours, whereby a composition 2 for making a contact was obtained.

As shown in Table 1, the composition 2 thus obtained contained a nickel-cobalt alloy containing 20% by weight of cobalt and 80% by weight of nickel and 0.002 part by weight of sulfur with respect to 100 parts by weight of the nickel-cobalt alloy. The composition 2 had an average particle size of 0.14 μm.

As shown in Table 1, the composition 2 thus obtained had a spring bending elastic limit of 791 MPa, a tensile strength of 1522 MPa, a conductivity of 16% IACS, and a stress relaxation of 15%. Five pieces of composition 2 were observed, and none of them was judged to be warped. Because the composition 2 had stress relaxation of 15% or lower, the composition 2 is thought to be more preferable in preventing the occurrence of a creep and achieving a long stroke than the composition 1 obtained in Example 1.

Example 3

Electroforming was carried out with a plating solution identical in condition to that of Example 1 by using a matrix identical to that of Example 1. After that, the resulting electroformed layer was taken out from the electrolytic cell, placed into a constant-temperature bath whose inner temperature had been kept at 250 to 270° C., and heat-treated by being left in the constant-temperature bath for 1 to 5 hours, whereby a composition 3 for making a contact was obtained.

As shown in Table 1, the composition 3 thus obtained contained a nickel-cobalt alloy containing 20% by weight of cobalt and 80% by weight of nickel and 0.002 part by weight of sulfur with respect to 100 parts by weight of the nickel-cobalt alloy. The composition 3 had an average particle size of 0.23 μm.

As shown in Table 1, the composition 3 thus obtained had a spring bending elastic limit of 743 MPa, a tensile strength of 1408 MPa, a conductivity of 16% IACS, and a stress relaxation of 10%. Five pieces of composition 3 were observed, and none of them was judged to be warped. Because the composition 3 had stress relaxation of 10% or lower, the composition 3 is thought to be more preferable in preventing the occurrence of a creep and achieving a long stroke than the composition 2 obtained in Example 2.

Example 4

Electroforming was carried out with a plating solution identical in condition to that of Example 1 by using a matrix identical to that of Example 1. After that, the resulting electroformed layer was taken out from the electrolytic cell, placed into a constant-temperature bath whose inner temperature had been kept at 300 to 350° C., and heat-treated by being left in the constant-temperature bath for 1 to 5 hours, whereby a composition 4 for making a contact was obtained.

As shown in Table 1, the composition 4 thus obtained contained a nickel-cobalt alloy containing 20% by weight of cobalt and 80% by weight of nickel and 0.002 part by weight of sulfur with respect to 100 parts by weight of the nickel-cobalt alloy. The composition 4 had an average particle size of 0.35 μm.

As shown in Table 1, the composition 4 thus obtained had a spring bending elastic limit of 715 MPa, a tensile strength of 1371 MPa, a conductivity of 16% IACS, and a stress relaxation of 5%. Five pieces of composition 4 were observed, and none of them was judged to be warped. Because the composition 4 had stress relaxation of 10% or lower, the composition 4 is thought to be as preferable in preventing the occurrence of a creep and achieving a long stroke as the composition 1 obtained in Example 1.

Example 5

As a NiCo plating solution, a plating solution with a pH of 3.6 to 4.3 containing 436 to 545 g/L (Ni=90 to 100 g/L) of sulfamic acid Ni (NS-160, manufactured by Showa Chemical Industry Co., Ltd.), 49 to 82 g/L (Co=9 to 15 g/L) of 60% sulfamic acid Co (manufactured by Showa Chemical Industry Co., Ltd.), 20 to 40 g/L of boric acid (manufactured by Showa Chemical Industry Co., Ltd.), 0.02 to 0.1% by weight of a surface-active agent, and 0.2 to 0.3% by weight of saccharin was used. A plating bath was prepared by filling an electrolytic cell with the plating solution.

Electroforming was carried out by using a matrix identical to that of Example 1 with the plating bath set at a temperature of 40 to 50° C. and at an electric current density of 6 to 9 $A/dm^2$. After that, the resulting electroformed layer was taken out from the electrolytic cell, placed into a constant-temperature bath whose inner temperature had been kept at 180 to 220° C., and heat-treated by being left in the constant-temperature bath for 1 to 5 hours, whereby a composition 5 for making a contact was obtained.

As shown in Table 1, the composition 5 thus obtained contained a nickel-cobalt alloy containing 20% by weight of cobalt and 80% by weight of nickel and 0.020 part by weight of sulfur with respect to 100 parts by weight of the nickel-cobalt alloy. The composition 5 had an average particle size of 0.10 μm.

As shown in Table 1, the composition 5 thus obtained had a spring bending elastic limit of 854 MPa, a tensile strength of 1752 MPa, a conductivity of 14% IACS, and a stress relaxation of 25%. As a result of observation of five pieces of composition 5, none of them was judged to be warped. These results were as preferable of values in achieving a long stroke as those of Example 1.

Example 6

Electroforming was carried out with a plating solution identical in condition to that of Example 5 by using a matrix identical to that of Example 1. After that, the resulting electroformed layer was taken out from the electrolytic cell, placed into a constant-temperature bath whose inner temperature had been kept at 230 to 250° C., and heat-treated by being left in the constant-temperature bath for 1 to 5 hours, whereby a composition 6 for making a contact was obtained.

As shown in Table 1, the composition 6 thus obtained contained a nickel-cobalt alloy containing 20% by weight of cobalt and 80% by weight of nickel and 0.020 part by weight of sulfur with respect to 100 parts by weight of the nickel-cobalt alloy. The composition 6 had an average particle size of 0.14 μm.

As shown in Table 1, the composition 6 thus obtained had a spring bending elastic limit of 798 MPa, a tensile strength of 1545 MPa, a conductivity of 16% IACS, and a stress relaxation of 14%. Five pieces of composition 6 were observed, and none of them was judged to be warped. Because the composition 6 had stress relaxation of 15% or lower, the composition 6 is thought to be more preferable in preventing the occurrence of a creep and achieving a long stroke than the composition 5 obtained in Example 5.

Example 7

Electroforming was carried out with a plating solution identical in condition to that of Example 5 by using a matrix identical to that of Example 1. After that, the resulting electroformed layer was taken out from the electrolytic cell, placed into a constant-temperature bath whose inner temperature had been kept at 250 to 300° C., and heat-treated by being left in the constant-temperature bath for 1 to 5 hours, whereby a composition 7 for making a contact was obtained.

As shown in Table 1, the composition 7 thus obtained contained a nickel-cobalt alloy containing 20% by weight of cobalt and 80% by weight of nickel and 0.020 part by weight of sulfur with respect to 100 parts by weight of the nickel-cobalt alloy. The composition 7 had an average particle size of 0.23 μm.

As shown in Table 1, the composition 7 thus obtained had a spring bending elastic limit of 738 MPa, a tensile strength of 1448 MPa, a conductivity of 16% IACS, and a stress relaxation of 9%. Five pieces of composition 7 were observed, and none of them was judged to be warped. Because the composition 7 had stress relaxation of 10% or lower, the composition 7 is thought to be more preferable in preventing the occurrence of a creep and achieving a long stroke than the composition 6 obtained in Example 6.

Example 8

Electroforming was carried out with a plating solution identical in condition to that of Example 5 by using a matrix identical to that of Example 1. After that, the resulting electroformed layer was taken out from the electrolytic cell, placed into a constant-temperature bath whose inner temperature had been kept at 300 to 350° C., and heat-treated by being left in the constant-temperature bath for 1 to 5 hours, whereby a composition 8 for making a contact was obtained.

As shown in Table 1, the composition 8 thus obtained contained a nickel-cobalt alloy containing 20% by weight of cobalt and 80% by weight of nickel and 0.020 part by weight of sulfur with respect to 100 parts by weight of the nickel-cobalt alloy. The composition 8 had an average particle size of 0.35 μm.

As shown in Table 1, the composition 8 thus obtained had a spring bending elastic limit of 721 MPa, a tensile strength of 1403 MPa, a conductivity of 16% IACS, and a stress relaxation of 5%. Five pieces of composition 8 were observed, and none of them was judged to be warped. Because the composition 8 had stress relaxation of 10% or lower, the composition 8 is thought to be as preferable in achieving a long stroke as the composition 7 obtained in Example 7.

Example 9

As a NiCo plating solution, a plating solution with a pH of 3.6 to 4.3 containing 273 to 382 g/L (Ni=50 to 70 g/L) of sulfamic acid Ni (NS-160, manufactured by Showa Chemical Industry Co., Ltd.), 125 to 191 g/L (Co=23 to 35 g/L) of 60% sulfamic acid Co (manufactured by Showa Chemical Industry Co., Ltd.), 20 to 40 g/L of boric acid (manufactured by Showa Chemical Industry Co., Ltd.), 0.02 to 0.1% by weight of a surface-active agent, and 0.01 to 0.1% by weight of saccharin was used. A plating bath was prepared by filling an electrolytic cell with the plating solution.

Electroforming was carried out by using a matrix identical to that of Example 1 with the plating bath set at a temperature of 55 to 65° C. and at an electric current density of 6 to 9 A/dm$^2$. After that, the resulting electroformed layer was taken out from the electrolytic cell, placed into a constant-temperature bath whose inner temperature had been kept at 180 to 220° C., and heat-treated by being left in the constant-temperature bath for 1 to 5 hours, whereby a composition 9 for making a contact was obtained.

As shown in Table 2, the composition 9 thus obtained contained a nickel-cobalt alloy containing 55% by weight of cobalt and 45% by weight of nickel and 0.002 part by weight of sulfur with respect to 100 parts by weight of the nickel-cobalt alloy. The composition 9 had an average particle size of 0.10 μm.

As shown in Table 2, the composition 9 thus obtained had a spring bending elastic limit of 851 MPa, a tensile strength of 1765 MPa, a conductivity of 14% IACS, and a stress relaxation of 23%. Five pieces of composition 9 were observed, and none of them was judged to be warped. The results obtained in Example 9 were as preferable of values in achieving a long stroke as those obtained in Example 1.

Example 10

Electroforming was carried out with a plating solution identical in condition to that of Example 9 by using a matrix identical to that of Example 1. After that, the resulting electroformed layer was taken out from the electrolytic cell, placed into a constant-temperature bath whose inner temperature had been kept at 230 to 250° C., and heat-treated by being left in the constant-temperature bath for 1 to 5 hours, whereby a composition 10 for making a contact was obtained.

As shown in Table 2, the composition 10 thus obtained contained a nickel-cobalt alloy containing 55% by weight of cobalt and 45% by weight of nickel and 0.002 part by weight of sulfur with respect to 100 parts by weight of the nickel-cobalt alloy. The composition 10 had an average particle size of 0.14 μm.

As shown in Table 2, the composition 10 thus obtained had a spring bending elastic limit of 811 MPa, a tensile strength of 1608 MPa, a conductivity of 16% IACS, and a stress relaxation of 13%. Five pieces of composition 10 were observed, and none of them was judged to be warped. Because the composition 10 had stress relaxation of 15% or lower, the composition 10 is thought to be more preferable in preventing the occurrence of a creep and achieving a long stroke than the composition 9 obtained in Example 9.

Example 11

Electroforming was carried out with a plating solution identical in condition to that of Example 9 by using a matrix identical to that of Example 1. After that, the resulting electroformed layer was taken out from the electrolytic cell, placed into a constant-temperature bath whose inner temperature had been kept at 250 to 270° C., and heat-treated by being left in the constant-temperature bath for 1 to 5 hours, whereby a composition 11 for making a contact was obtained.

As shown in Table 2, the composition 11 thus obtained contained a nickel-cobalt alloy containing 55% by weight of cobalt and 45% by weight of nickel and 0.002 part by weight of sulfur with respect to 100 parts by weight of the nickel-cobalt alloy. The composition 11 had an average particle size of 0.23 μm.

As shown in Table 2, the composition 11 thus obtained had a spring bending elastic limit of 766 MPa, a tensile strength of 1421 MPa, a conductivity of 16% IACS, and a stress relaxation of 9%. Five pieces of composition 11 were observed, and none of them was judged to be warped. Because the composition 11 had stress relaxation of 10% or lower, the composition 11 is thought to be more preferable in preventing the occurrence of a creep and achieving a long stroke than the composition 10 obtained in Example 10.

Example 12

Electroforming was carried out with a plating solution identical in condition to that of Example 9 by using a matrix identical to that of Example 1. After that, the resulting electroformed layer was taken out from the electrolytic cell, placed into a constant-temperature bath whose inner temperature had been kept at 300 to 350° C., and heat-treated by being left in the constant-temperature bath for 1 to 5 hours, whereby a composition 12 for making a contact was obtained.

As shown in Table 2, the composition 12 thus obtained contained a nickel-cobalt alloy containing 55% by weight of cobalt and 45% by weight of nickel and 0.002 part by weight of sulfur with respect to 100 parts by weight of the nickel-cobalt alloy. The composition 12 had an average particle size of 0.35 μm.

As shown in Table 2, the composition 12 thus obtained had a spring bending elastic limit of 711 MPa, a tensile strength of 1388 MPa, a conductivity of 16% IACS, and a stress relaxation of 5%. Five pieces of composition 12 were observed, and none of them was judged to be warped. Because the composition 12 had stress relaxation of 10% or lower, the composition 12 is thought to be as preferable in preventing the occurrence of a creep and achieving a long stroke as the composition 11 obtained in Example 11.

Example 13

As a NiCo plating solution, a plating solution with a pH of 3.6 to 4.3 containing 273 to 382 g/L (Ni=50 to 70 g/L) of sulfamic acid Ni (NS-160, manufactured by Showa Chemical Industry Co., Ltd.), 125 to 191 g/L (Co=23 to 35 g/L) of 60% sulfamic acid Co (manufactured by Showa Chemical Industry Co., Ltd.), 20 to 40 g/L of boric acid (manufactured by Showa Chemical Industry Co., Ltd.), 0.02 to 0.1% by weight of a surface-active agent, and 0.2 to 0.3% by weight of saccharin was used. A plating bath was prepared by filling an electrolytic cell with the plating solution.

Electroforming was carried out by using a matrix identical to that of Example 1 with the plating bath set at a temperature of 40 to 50° C. and at an electric current density of 6 to 9 $A/dm^2$. After that, the resulting electroformed layer was taken out from the electrolytic cell, placed into a constant-temperature bath whose inner temperature had been kept at 180 to 220° C., and heat-treated by being left in the constant-temperature bath for 1 to 5 hours, whereby a composition 13 for making a contact was obtained.

As shown in Table 2, the composition 13 thus obtained contained a nickel-cobalt alloy containing 55% by weight of cobalt and 45% by weight of nickel and 0.020 part by weight of sulfur with respect to 100 parts by weight of the nickel-cobalt alloy. The composition 13 had an average particle size of 0.10 μm.

As shown in Table 2, the composition 13 thus obtained had a spring bending elastic limit of 854 MPa, a tensile strength of 1720 MPa, a conductivity of 14% IACS, and a stress relaxation of 21%. Five pieces of composition 13 were observed, and none of them was judged to be warped. The results obtained in Example 13 were as preferable of values in achieving a long stroke as those obtained in Example 1.

Example 14

Electroforming was carried out with a plating solution identical in condition to that of Example 13 by using a matrix identical to that of Example 1. After that, the resulting electroformed layer was taken out from the electrolytic cell, placed into a constant-temperature bath whose inner temperature had been kept at 230 to 250° C., and heat-treated by being left in the constant-temperature bath for 1 to 5 hours, whereby a composition 14 for making a contact was obtained.

As shown in Table 2, the composition 14 thus obtained contained a nickel-cobalt alloy containing 55% by weight of cobalt and 45% by weight of nickel and 0.020 part by weight of sulfur with respect to 100 parts by weight of the nickel-cobalt alloy. The composition 14 had an average particle size of 0.14 μm.

As shown in Table 2, the composition 14 thus obtained had a spring bending elastic limit of 803 MPa, a tensile strength of 1598 MPa, a conductivity of 16% IACS, and a stress relaxation of 14%. Five pieces of composition 14 were observed, and none of them was judged to be warped. Because the composition 14 had stress relaxation of 15% or lower, the composition 14 is thought to be more preferable in preventing the occurrence of a creep and achieving a long stroke than the composition 13 obtained in Example 13.

Example 15

Electroforming was carried out with a plating solution identical in condition to that of Example 13 by using a matrix identical to that of Example 1. After that, the resulting electroformed layer was taken out from the electrolytic cell, placed into a constant-temperature bath whose inner temperature had been kept at 250 to 270° C., and heat-treated by being left in the constant-temperature bath for 1 to 5 hours, whereby a composition 15 for making a contact was obtained.

As shown in Table 2, the composition 15 thus obtained contained a nickel-cobalt alloy containing 55% by weight of cobalt and 45% by weight of nickel and 0.020 part by weight of sulfur with respect to 100 parts by weight of the nickel-cobalt alloy. The composition 15 had an average particle size of 0.23 μm.

As shown in Table 2, the composition 15 thus obtained had a spring bending elastic limit of 782 MPa, a tensile strength of 1482 MPa, a conductivity of 16% IACS, and a stress relaxation of 10%. Five pieces of composition 15 were observed, and none of them was judged to be warped. Because the composition 15 had stress relaxation of 10% or lower, the composition 15 is thought to be more preferable in preventing the occurrence of a creep and achieving a long stroke than the composition 14 obtained in Example 14.

Example 16

Electroforming was carried out with a plating solution identical in condition to that of Example 13 by using a matrix identical to that of Example 1. After that, the resulting electroformed layer was taken out from the electrolytic cell, placed into a constant-temperature bath whose inner temperature had been kept at 300 to 350° C., and heat-treated by being left in the constant-temperature bath for 1 to 5 hours, whereby a composition 16 for making a contact was obtained.

As shown in Table 2, the composition 16 thus obtained contained a nickel-cobalt alloy containing 55% by weight of cobalt and 45% by weight of nickel and 0.020 part by weight of sulfur with respect to 100 parts by weight of the nickel-cobalt alloy. The composition 15 had an average particle size of 0.35 μm.

As shown in Table 2, the composition 16 thus obtained had a spring bending elastic limit of 725 MPa, a tensile strength of 1415 MPa, a conductivity of 16% IACS, and a stress relaxation of 5%. Five pieces of composition 16 were observed, and none of them was judged to be warped. Because the composition 16 had stress relaxation of 10% or lower, the composition 16 is thought to be as preferable in preventing the occurrence of a creep and achieving a long stroke as the composition 15 obtained in Example 15.

Comparative Example 1

With use, as a NiCo plating solution, of a plating solution with a pH of 3.6 to 4.3 containing 600 to 709 g/L (Ni=110 to 130 g/L) of sulfamic acid Ni (NS-160, manufactured by Showa Chemical Industry Co., Ltd.), 11 to 33 g/L (Co=2 to 6 g/L) of 60% sulfamic acid Co (manufactured by Showa Chemical Industry Co., Ltd.), 20 to 40 g/L of boric acid (manufactured by Showa Chemical Industry Co., Ltd.), 0.02 to 0.1% by weight of a surface-active agent, and 0.05 to 0.08% by weight of saccharin, electroforming was carried out by using a matrix identical to that of Example 1 with the plating bath set at a temperature of 55 to 65° C. and at an electric current density of 6 to 9 A/dm$^2$.

After that, the resulting electroformed layer was taken out from the electrolytic cell, placed into a constant-temperature bath whose inner temperature had been kept at 180 to 220° C., and heat-treated by being left in the constant-temperature bath for 1 to 5 hours, whereby a comparative composition 1 for making a contact was obtained.

The comparative composition 1 thus obtained contained a nickel-cobalt alloy containing 8% by weight of cobalt and 92% by weight of nickel and 0.005 part by weight of sulfur with respect to 100 parts by weight of the nickel-cobalt alloy. The comparative composition 1 had an average particle size of 0.23 μm.

As shown in Table 3, the comparative composition 1 thus obtained had a spring bending elastic limit of 630 MPa, a tensile strength of 1177 MPa, a conductivity of 16% IACS, and a stress relaxation of 33%. Five pieces of comparative composition 1 were observed, and none of them was judged to be warped.

Therefore, it can be said, from the spring bending elastic limit, tensile strength, and stress relaxation thus obtained, that the comparative composition 1 is insufficient to achieve a contact having a long stroke with sufficient suppression of the occurrence of a creep. This is considered to be due to the low percent by weight of Co.

Comparative Example 2

With use, as a NiCo plating solution, of a plating solution with a pH of 3.6 to 4.3 containing 218 to 327 g/L (Ni=40 to 60 g/L) of sulfamic acid Ni (NS-160, manufactured by Showa Chemical Industry Co., Ltd.), 147 to 245 g/L (Co=27 to 45 g/L) of 60% sulfamic acid Co (manufactured by Showa Chemical Industry Co., Ltd.), 20 to 40 g/L of boric acid (manufactured by Showa Chemical Industry Co., Ltd.), 0.02 to 0.1% by weight of a surface-active agent, and 0.05 to 0.08% by weight of saccharin, electroforming was carried out by using a matrix identical to that of Example 1 with the plating bath set at a temperature of 55 to 65° C. and at an electric current density of 6 to 9 A/dm$^2$.

After that, the resulting electroformed layer was taken out from the electrolytic cell, placed into a constant-temperature bath whose inner temperature had been kept at 180 to 220° C., and heat-treated by being left in the constant-temperature bath for 1 to 5 hours, whereby a comparative composition 2 for making a contact was obtained.

The comparative composition 2 thus obtained contained a nickel-cobalt alloy containing 65% by weight of cobalt and 35% by weight of nickel and 0.005 part by weight of sulfur with respect to 100 parts by weight of the nickel-cobalt alloy. The comparative composition 2 had an average particle size of 0.12 μm.

As shown in Table 3, all of the five observed pieces of comparative composition 2 thus obtained were judged to be warped. Because of the occurrence of warpage, no test was able be carried for the spring bending elastic limit, the tensile strength, or the stress relaxation, nor was a composition for making a contact able to be made. This is considered to be due to the high percent by weight of Co.

Comparative Example 3

With use, as a NiCo plating solution, of a plating solution with a pH of 3.6 to 4.3 containing 436 to 545 g/L (Ni=90 to 100 g/L) of sulfamic acid Ni (NS-160, manufactured by Showa Chemical Industry Co., Ltd.), 49 to 82 g/L (Co=9 to 15 g/L) of 60% sulfamic acid Co (manufactured by Showa Chemical Industry Co., Ltd.), 20 to 40 g/L of boric acid (manufactured by Showa Chemical Industry Co., Ltd.), and 0.02 to 0.1% by weight of a surface-active agent, electroforming was carried out by using a matrix identical to that of Example 1 with the plating bath set at a temperature of 55 to 65° C. and at an electric current density of 6 to 9 A/dm$^2$.

After that, the resulting electroformed layer was taken out from the electrolytic cell, placed into a constant-temperature bath whose inner temperature had been kept at 180 to 220° C., and heat-treated by being left in the constant-temperature bath for 1 to 5 hours, whereby a comparative composition 3 for making a contact was obtained.

The comparative composition 3 thus obtained contained a nickel-cobalt alloy containing 20% by weight of cobalt and 80% by weight of nickel and 0.001 part by weight of sulfur with respect to 100 parts by weight of the nickel-cobalt alloy. The comparative composition 3 had an average particle size of 0.26 μm.

As shown in Table 3, the comparative composition 3 thus obtained had a spring bending elastic limit of 324 MPa, a tensile strength of 978 MPa, a conductivity of 16% IACS, and a stress relaxation of 27%. None of the five observed pieces of comparative composition 3 was judged to be warped.

It can be said, from the spring bending elastic limit and tensile strength thus obtained, that the comparative composition 3 is insufficient to achieve a contact having a long stroke with sufficient suppression of the occurrence of a creep. This is considered to be due to the small part by weight of sulfur.

Comparative Example 4

With use, as a NiCo plating solution, of a plating solution with a pH of 3.6 to 4.3 containing 436 to 545 g/L (Ni=90 to 100 g/L) of sulfamic acid Ni (NS-160, manufactured by Showa Chemical Industry Co., Ltd.), 49 to g/L (Co=9 to 15 g/L) of 60% sulfamic acid Co (manufactured by Showa Chemical Industry Co., Ltd.), 20 to 40 g/L of boric acid (manufactured by Showa Chemical Industry Co., Ltd.), 0.02 to 0.1% by weight of a surface-active agent, and 0.2 to 0.3% by weight of saccharin, electroforming was carried out by using a matrix identical to that of Example 1 with the plating bath set at a temperature of 40 to 50° C. and at an electric current density of 6 to 9 A/dm$^2$.

After that, the resulting electroformed layer was taken out from the electrolytic cell, placed into a constant-temperature bath whose inner temperature had been kept at 180 to 220° C., and heat-treated by being left in the constant-temperature bath for 1 to 5 hours, whereby a comparative composition 4 for making a contact was obtained.

The comparative composition 4 thus obtained contained a nickel-cobalt alloy containing 20% by weight of cobalt and 80% by weight of nickel and 0.021 part by weight of sulfur with respect to 100 parts by weight of the nickel-cobalt alloy. The comparative composition 4 had an average particle size of 0.11 μm.

As shown in Table 3, the comparative composition 4 thus obtained had a spring bending elastic limit of 720 MPa, a tensile strength of 500 MPa, a conductivity of 14% IACS, and a stress relaxation of 28%. None of the five observed pieces of comparative composition 4 was judged to be warped.

It can be said, from the spring bending elastic limit and tensile strength thus obtained, that the comparative composition 4 is insufficient to achieve a contact having a long stroke with sufficient suppression of the occurrence of a creep. This is considered to be due to the large part by weight of sulfur.

Comparative Example 5

With use, as a NiCo plating solution, of a plating solution with a pH of 3.6 to 4.3 containing 436 to 545 g/L (Ni=90 to 100 g/L) of sulfamic acid Ni (NS-160, manufactured by Showa Chemical Industry Co., Ltd.), 49 to 82 g/L (Co=9 to 15 g/L) of 60% sulfamic acid Co (manufactured by Showa Chemical Industry Co., Ltd.), 20 to 40 g/L of boric acid (manufactured by Showa Chemical Industry Co., Ltd.), 0.02 to 0.1% by weight of a surface-active agent, and 0.03 to 0.05% by weight of saccharin, electroforming was carried out by using a matrix identical to that of Example 1 with the plating bath set at a temperature of 55 to 65° C. and at an electric current density of 9 to 12 A/dm$^2$.

After that, the resulting electroformed layer was taken out from the electrolytic cell, placed into a constant-temperature bath whose inner temperature had been kept at 150 to 180° C., and heat-treated by being left in the constant-temperature bath for 1 to 5 hours, whereby a comparative composition 5 for making a contact was obtained.

The comparative composition 5 thus obtained contained a nickel-cobalt alloy containing 20% by weight of cobalt and 80% by weight of nickel and 0.005 part by weight of sulfur with respect to 100 parts by weight of the nickel-cobalt alloy. The comparative composition 5 had an average particle size of 0.09 μm.

As shown in Table 3, the comparative composition 5 thus obtained had a spring bending elastic limit of 780 MPa, a tensile strength of 1831 MPa, a conductivity of 13% IACS, and a stress relaxation of 31%. None of the five observed pieces of comparative composition 5 was judged to be warped.

It can be said, from the stress relaxation thus obtained, that the comparative composition 5 is insufficient to achieve a contact having a long stroke with sufficient suppression of the occurrence of a creep. This is considered to be due to the fact that the average particle size is small.

Comparative Example 6

With use, as a NiCo plating solution, of a plating solution with a pH of 3.6 to 4.3 containing 436 to 545 g/L (Ni=90 to 100 g/L) of sulfamic acid Ni (NS-160, manufactured by Showa Chemical Industry Co., Ltd.), 49 to g/L (Co=9 to 15 g/L) of 60% sulfamic acid Co (manufactured by Showa Chemical Industry Co., Ltd.), 20 to 40 g/L of boric acid (manufactured by Showa Chemical Industry Co., Ltd.), 0.02 to 0.1% by weight of a surface-active agent, and 0.03 to 0.05% by weight of saccharin, electroforming was carried out by using a matrix identical to that of Example 1 with the plating bath set at a temperature of 55 to 65° C. and at an electric current density of 6 to 9 A/dm$^2$.

After that, the resulting electroformed layer was taken out from the electrolytic cell, placed into a constant-temperature bath whose inner temperature had been kept at 300 to 350° C., and heat-treated by being left in the constant-temperature bath for 5 to 10 hours, whereby a comparative composition 6 for making a contact was obtained.

The comparative composition 6 thus obtained contained a nickel-cobalt alloy containing 20% by weight of cobalt and 80% by weight of nickel and 0.005 part by weight of sulfur with respect to 100 parts by weight of the nickel-cobalt alloy. The comparative composition 6 had an average particle size of 0.36 μm.

As shown in Table 3, the comparative composition 6 thus obtained had a spring bending elastic limit of 698 MPa, a tensile strength of 1226 MPa, a conductivity of 16% IACS, and a stress relaxation of 6%. None of the five observed pieces of comparative composition 6 was judged to be warped.

It can be said, from the spring bending elastic limit and tensile strength thus obtained, that the comparative composition 6 is insufficient to achieve a contact having a long stroke with sufficient suppression of the occurrence of a creep. This is considered to be due to the fact that the average particle size is large.

Comparative Example 7

In Comparative Example 7, phosphor bronze C5210-SH (manufactured by HARADA METAL INDUSTRY Co., Ltd.) was sampled under test as a control, whose proportion of Co in alloy, sulfur content, and average particle size are therefore not shown in Table 3. As shown in Table 3, phosphor bronze C5210-SH had a spring bending elastic limit of 678 MPa, a tensile strength of 814 MPa, a conductivity of 13% IACS, and a stress relaxation of 30%. Because phosphor bronze C5210-SH is therefore insufficient in tensile strength, it can be said that phosphor bronze C5210-SH is insufficient to achieve a contact having a long stroke with sufficient suppression of the occurrence of a creep.

Comparative Example 8

In Comparative Example 8, SUS301-H (manufactured by TOYO SEIHAKU CO., LTD.) was sampled under test as a control, whose proportion of Co in alloy, sulfur content, and average particle size are therefore not shown in Table 3. As shown in Table 3, SUS301-H had a spring bending elastic limit of 490 MPa, a tensile strength of 1320 MPa, a conductivity of 5% IACS, and a stress relaxation of 10%. Because SUS301-H is therefore insufficient in spring bending elastic limit and conductivity, it can be said that SUS301-H is insufficient to achieve a contact having a long stroke with sufficient suppression of the occurrence of a creep.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

A composition for making a contact according to one or more embodiments of the present invention is excellent in spring bending elastic limit, tensile strength, conductivity, and stress relaxation, and therefore can provide a contact having a long stroke with sufficient suppression of the occurrence of a creep. Such a contact can take any shape for any purpose, and can therefore be used in a variety of connectors. Therefore, embodiments of the present invention can be widely used in various electric industries, electronic industries, etc.

REFERENCE NUMERALS

11 Matrix
12 Composition for making a contact
13 Conducting base material
14 Insulating layer
15 Cavity
16 Dry film photoresist
17 Mask
18 Metal layer
19 Electrolytic cell
20 DC power source
21 Counter electrode
31 Contact
32 Elastic deformation section
33 Contact section
34 Retaining section
35 Electrode section
200 Contact
201 Retaining section
202 Contact section
203 Elastic deformation section
204 Conductive member
300 Battery connector
310 Housing
320 Contact
$\alpha$ Plating solution
400 Electrodeposited surface
401 Surface that faces the base material
402 Site of measurement

The invention claimed is:

1. A contact comprising:

a retaining section fixed by an insulator;

a contact section that makes sliding contact with a conductive member; and an elastic deformation section that connects the retaining section and the contact section to each other, and that is elastically deformable, at least the elastic deformation section containing a composition for making the contact, the composition including:

a nickel-cobalt alloy containing 20% by weight to 55% by weight of cobalt; and 0.002 part by weight to 0.02 part by weight of sulfur with respect to 100 parts by weight of the nickel-cobalt alloy, the composition having an average particle size of 0.14 μm to 0.35 μm.

2. The contact as set forth in claim 1, wherein the composition has an average particle size of 0.23 μm to 0.35 μm.

3. The contact as set forth in claim 1, wherein the composition contained in the contact is one obtained by heat-treating an electroformed layer made by electroforming.

4. The contact as set forth in claim 1, wherein the composition contained in the contact is one obtained by heat-treating, at 180 to 350° C. for 1 to 48 hours, an electroformed layer made by electroforming.

5. A connector comprising a contact as set forth in claim 1.

6. The connector as set forth in claim 5, said connector being a battery connector.

7. A method for making a contact as set forth in claim 1, the method comprising a step of heat-treating an electroformed layer made by electroforming.

* * * * *